(12) United States Patent
Heckler et al.

(10) Patent No.: US 11,820,416 B1
(45) Date of Patent: Nov. 21, 2023

(54) CONVERTIBLE STROLLER ASSEMBLY WITH POP-UP PRIVACY PANELS

(71) Applicants: Jenny Heckler, Cincinnati, OH (US);
Julianne Cook, Spring Valley, OH (US)

(72) Inventors: Jenny Heckler, Cincinnati, OH (US);
Julianne Cook, Spring Valley, OH (US)

( * ) Notice: Subject to any disclaimer, the term of this patent is extended or adjusted under 35 U.S.C. 154(b) by 0 days.

(21) Appl. No.: 18/140,992

(22) Filed: Apr. 28, 2023

(51) Int. Cl.
  *B62B 7/12* (2006.01)
  *B62B 9/10* (2006.01)
  *B62B 9/12* (2006.01)
  *A47D 5/00* (2006.01)

(52) U.S. Cl.
  CPC ............... *B62B 7/12* (2013.01); *A47D 5/006* (2013.01); *B62B 9/104* (2013.01); *B62B 9/12* (2013.01)

(58) Field of Classification Search
  CPC .............. B62B 7/12; B62B 9/104; B62B 9/12
  See application file for complete search history.

(56) References Cited

U.S. PATENT DOCUMENTS

| | | | | |
|---|---|---|---|---|
| 3,330,575 A | * | 7/1967 | Boudreau | B62B 9/26 280/649 |
| 4,577,355 A | * | 3/1986 | Kassai | B62B 9/104 5/99.1 |
| D310,645 S | * | 9/1990 | Julien | D12/129 |
| 5,201,535 A | * | 4/1993 | Kato | B62B 7/123 297/229 |
| 5,590,896 A | * | 1/1997 | Eichhorn | B62B 7/08 188/20 |
| 5,752,738 A | * | 5/1998 | Onishi | B62B 7/123 297/380 |
| 5,803,535 A | * | 9/1998 | Jane Cabagnero | B62B 7/123 297/184.13 |
| 5,918,933 A | * | 7/1999 | Hutchinson | A47C 7/383 297/229 |
| 5,954,404 A | * | 9/1999 | Suzuki | B62B 9/10 297/219.12 |
| 6,890,031 B2 | * | 5/2005 | Rhein | A47D 1/002 297/284.9 |
| 7,182,363 B2 | * | 2/2007 | Takubo | B62B 7/123 280/47.38 |

(Continued)

FOREIGN PATENT DOCUMENTS

CA 2161829 C * 4/2000 ............. A47C 1/024

*Primary Examiner* — Emma K Frick
(74) *Attorney, Agent, or Firm* — Cynthia S. Lamon; Lamon Patent Services

(57) ABSTRACT

A stroller platform includes a seat connected to a back rest portion, the back rest adjustable to fold down over the seat and adjustable to unfold from the seat, the back rest also adjustable to present a horizontal relationship with the seat, a pair of privacy panels connected to opposing edges of the seat, the privacy panels positional to assume a vertical position when the stroller platform is unfolded, and a prone position against the seat when the stroller platform is folded, and a pair of pull straps each anchored to a privacy panel on each side of the stroller platform, the pull straps routed through the slots provided through the seat portion, and back up to connect to respective arm bar base tubes connected to a stroller frame, the base tubes provided to seat an arm bar presenting to the front and above the seat portion of the stroller platform.

10 Claims, 25 Drawing Sheets

(56) References Cited

U.S. PATENT DOCUMENTS

| | | | | |
|---|---|---|---|---|
| 7,347,442 | B1* | 3/2008 | Carter | B62B 9/00 |
| | | | | 280/642 |
| 7,445,230 | B2* | 11/2008 | Kassai | B62B 7/123 |
| | | | | 280/644 |
| 8,151,389 | B1* | 4/2012 | Lando | A47D 15/005 |
| | | | | 5/655 |
| 9,826,809 | B2* | 11/2017 | Carter | A47D 5/006 |
| 9,924,806 | B2* | 3/2018 | Penello | B62B 9/12 |
| 10,106,187 | B1* | 10/2018 | Farrar | B62B 7/12 |
| 10,543,865 | B1* | 1/2020 | Ballard | B62B 7/123 |
| 10,875,563 | B2* | 12/2020 | Heckler | B62B 7/12 |
| 2004/0145224 | A1* | 7/2004 | Kassai | B62B 9/104 |
| | | | | 297/219.12 |

\* cited by examiner

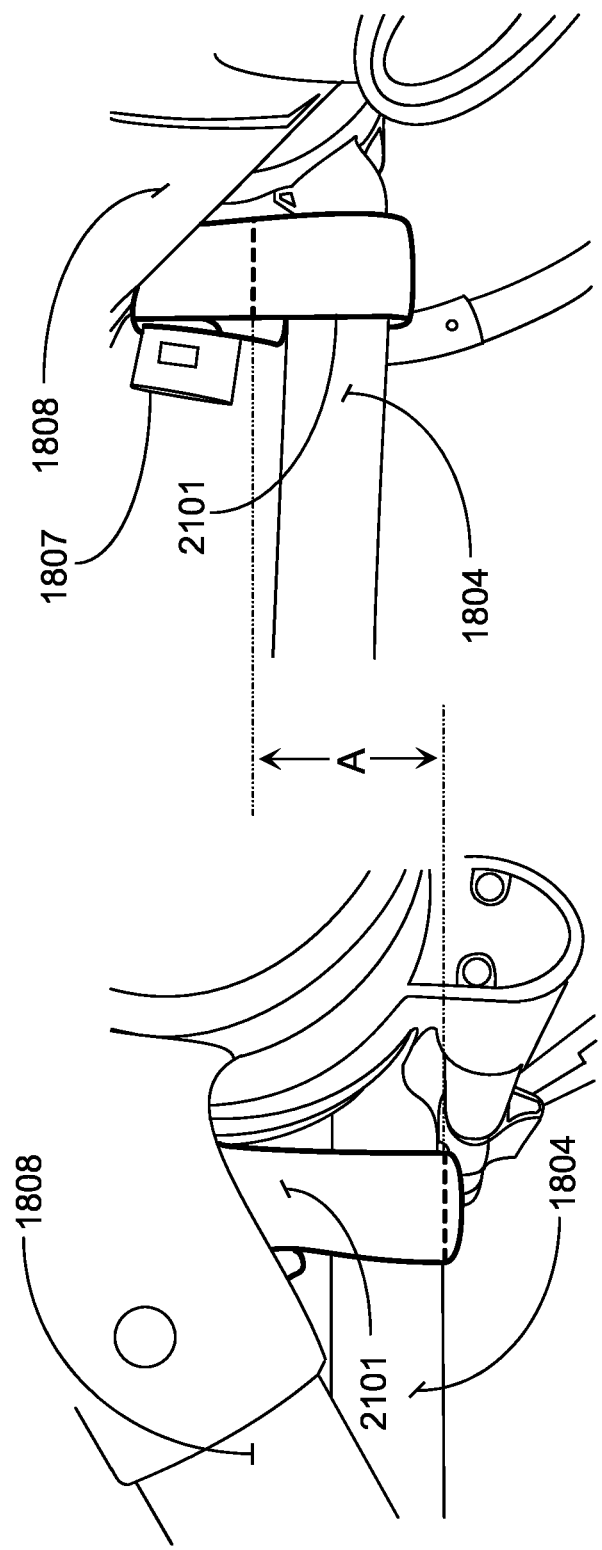

CONVERTIBLE STROLLER ASSEMBLY WITH POP-UP PRIVACY PANELS

CROSS-REFERENCE TO RELATED DOCUMENTS

The present invention claims priority to Chinese application 202180036858.1 filed Nov. 21, 2022, which claims priority to PCT/US2021/025837 filed Apr. 5, 2021, which is a continuation-in-part of an international application filed as PCT/US20/26728 filed on Apr. 3, 2020, which is a continuation-in-part of a U.S. patent application Ser. No. 16/373,800 filed on Apr. 3, 2019, disclosure of which is included herein at least by reference.

BACKGROUND OF THE INVENTION

1. Field of the Invention

The present invention is in the field of baby strollers and pertains more particularly to a convertible stroller assembly with pop-up privacy panels.

2. Discussion of the State of the Art

A stroller is commonly known to include a seat and a backrest coupled together so that the assembly may articulate such that the seat may remain horizontal and the backrest may be adjusted according to a desired angular position less off the seat. The seat and backrest are supported by a lightweight frame including at least four legs culminating in stroller wheels. A frame member may be provided as a push bar to enable a user to push the stroller. Strollers may typically include features that are provided for convenience to the user such as drink cups, fabric pockets, wheel brakes, staging trays, and canopies. Some strollers have double seating.

The inventor is aware of a stroller as referenced in the cross reference to related documents section above that is convertible into a diaper changing table by virtue of a angularly positioned seat and backrest assembly, which may be manually adjusted to a relative horizontal position so a baby may lie back securely for a diaper change. In addition to this capability of the stroller, the stroller includes opposing privacy panels one on each side of the stroller.

The privacy panels are vertically oriented at the sides of the stroller and are attached in a sliding manner to vertical frame elements of the stroller. These privacy panels maybe raised vertically past the horizontal plane of the stroller seat to form high opaque barriers on either side of the stroller seat. These panels are subject to rattle in wind, may be difficult to raise and latch, and may take up space on either side of the stroller where pockets and other features like diaper and wipe storage bags might be provided. The convertible stroller known to the inventor has a box like vertical frame design and a wheelbase length, and width and a seat elevation height that may not be safe in terms of support of a baby's weight. Toppling of the stroller could occur should the user engage in rolling up or down a moderate slope. Likewise, parking facing or orthogonal to the slope direction may cause toppling of the stroller.

One problem with the privacy panels is that the frame assemblies contain multiple parts and must be individually manipulated by the stroller operator to raise them and to lower them. Moreover, the stroller operator must make sure the panels are fully collapsed at both sides before folding the stroller frame from a relative horizontal position to a fully folded position for storage.

Therefore, what is clearly needed is a stroller that is convertible into a diaper changing table that reduces or eliminates the problems cited above.

BRIEF SUMMARY OF THE INVENTION

According to an embodiment of the present invention, an articulating stroller platform is provided and includes a materially encapsulated seat portion connected in an articulating manner to a materially encapsulated back rest portion, the back rest portion mechanically adjustable to fold down over the seat portion and to unfold from the folded position, the back rest portion additionally mechanically adjustable to present a horizontal relationship with the seat portion from a more acute angle with the seat portion for use as a diaper changing table, a pair of materially encapsulated privacy panels connected by material seam to opposing material edges of the seat portion, the privacy panels positional to assume a vertical position when the stroller platform is unfolded, and to assume a prone position against the top surface of the seat portion when the stroller platform is folded, and a pair of elongate pull straps each anchored to a privacy panel on each side of the stroller platform, the pull straps each routed through a pair of elongate slots provided through the seat portion, and routed back up to connect at respective free ends to respective ones of a pair of arm bar base tubes connected to a stroller frame, the base tubes provided to seat an arcuate tubular arm bar presenting to the front and above the seat portion of the stroller platform.

In one embodiment, each of the pull straps are attached by sewing to the respective privacy panel at the outside facing surface thereof. In another embodiment, each of the pull straps are attached by sewing to the respective privacy panel at the inside facing surface thereof and routed through the panel to the outside surface. In one embodiment, each of the pull straps is routed from the outside of the respective privacy panel downward into the respective elongate slot in the seat portion, out past the outside edge of the seat portion and upward to connect to or over the respective arm bar base tube. In another embodiment, each of the pull straps is routed from the outside of the respective privacy panel downward past the outside edge of the seat portion, inward and upward through the respective elongated slot in the seat portion and upward to connect to or over the respective arm bar base tube.

In one embodiment, the respective free ends of the pull straps are loops that are placed over the ends of the arm bar base tubes before the arm bar is attached to the stroller platform. In another embodiment, the respective free ends of the pull straps include a connection interface that connects to the arm bar base tubes. In this embodiment, the connection interface is a snap interface, a hook interface, or another hardware implementation.

In one embodiment, the privacy panels are urged inward by the interfacing sides of the backrest portion contacting the privacy panels at the top rear corners thereof upon folding the stroller platform. In one embodiment, the privacy panels are weighted at the inside surfaces to promote natural inward direction of fall while folding the stroller platform.

BRIEF DESCRIPTION OF THE SEVERAL VIEWS OF THE DRAWINGS

FIG. 21A is a partial enlarged view of the stroller of FIG. 18 according to detail 1811 depicting a pull strap first position relative to the seat bottom of the stroller in the open position with panels up.

FIG. 21B is a partial enlarged view of the stroller of FIG. 18 according to detail 1811 depicting advance travel of the pull strap through the slot in a folded state of the stroller.

FIG. 23 is a partial overhead perspective view of the stroller of FIG. 18 with material removed depicting a pair of slots through the seat bottom for routing pull straps through.

DETAILED DESCRIPTION OF THE INVENTION

Figure 1:
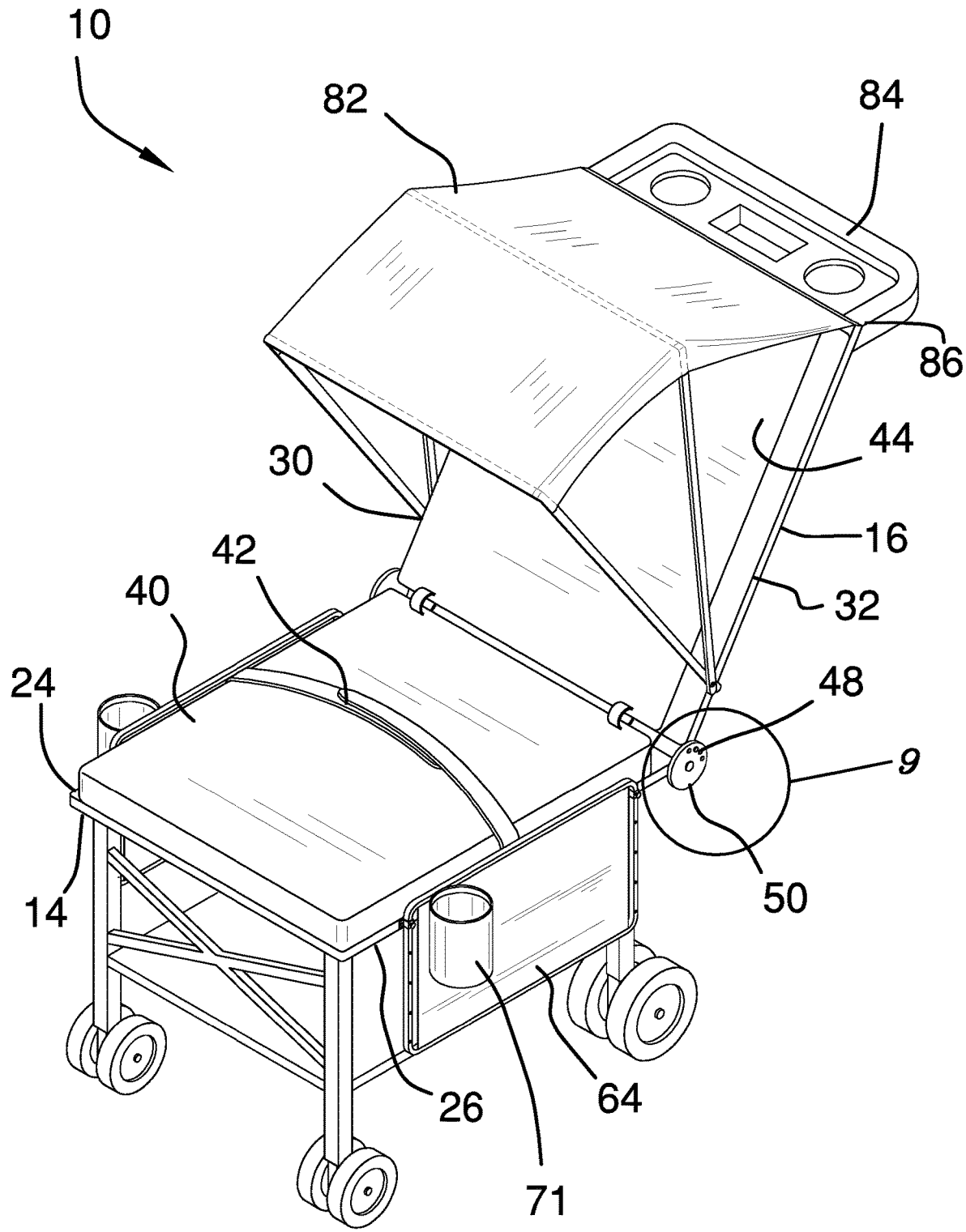
FIG. 1 is a perspective view of a convertible stroller assembly according to an embodiment of the disclosure.
Figure 2:
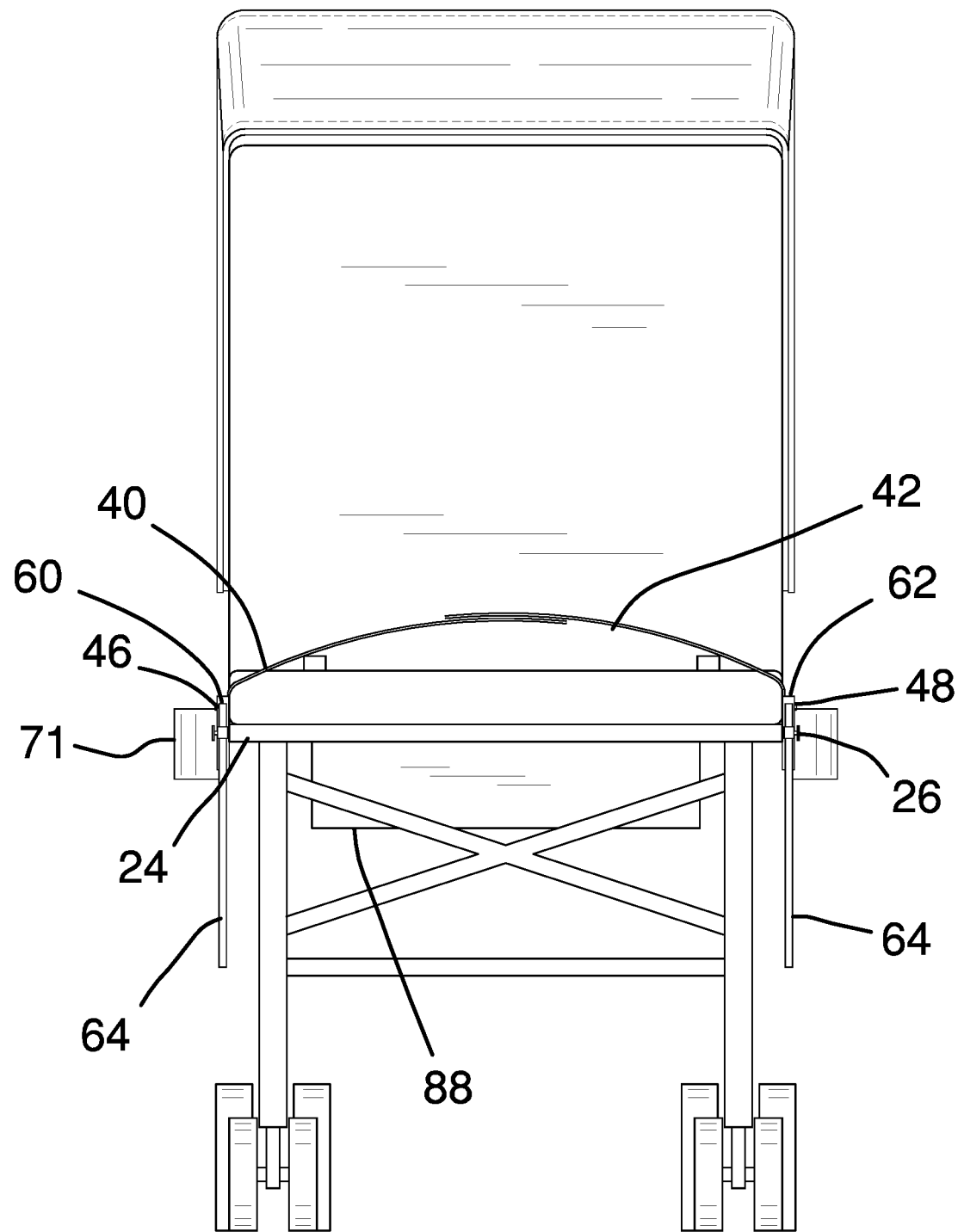
FIG. 2 is a front view of an embodiment of the disclosure.
Figure 3:
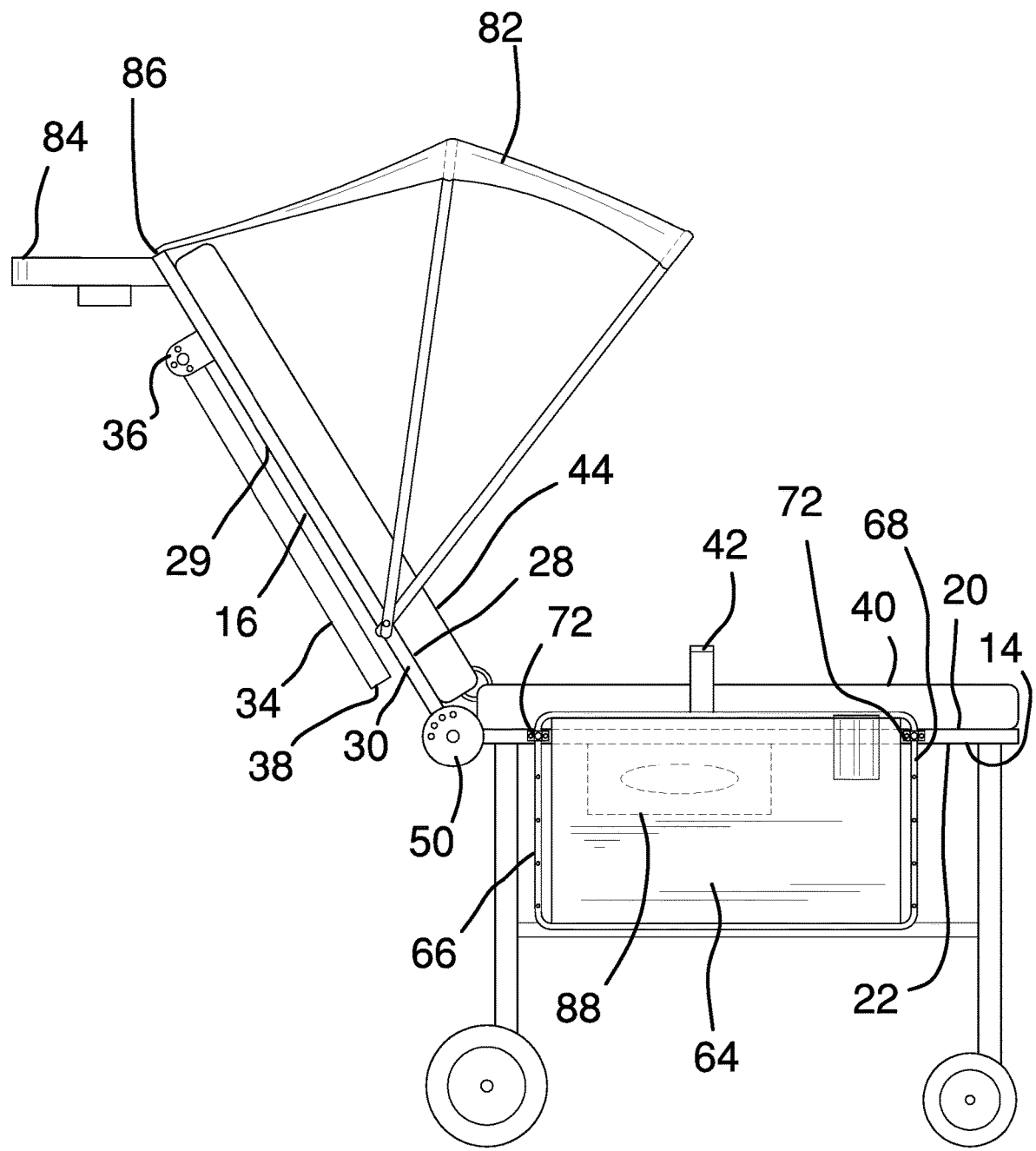
FIG. 3 is a right-side view of an embodiment of the disclosure.
Figure 4:
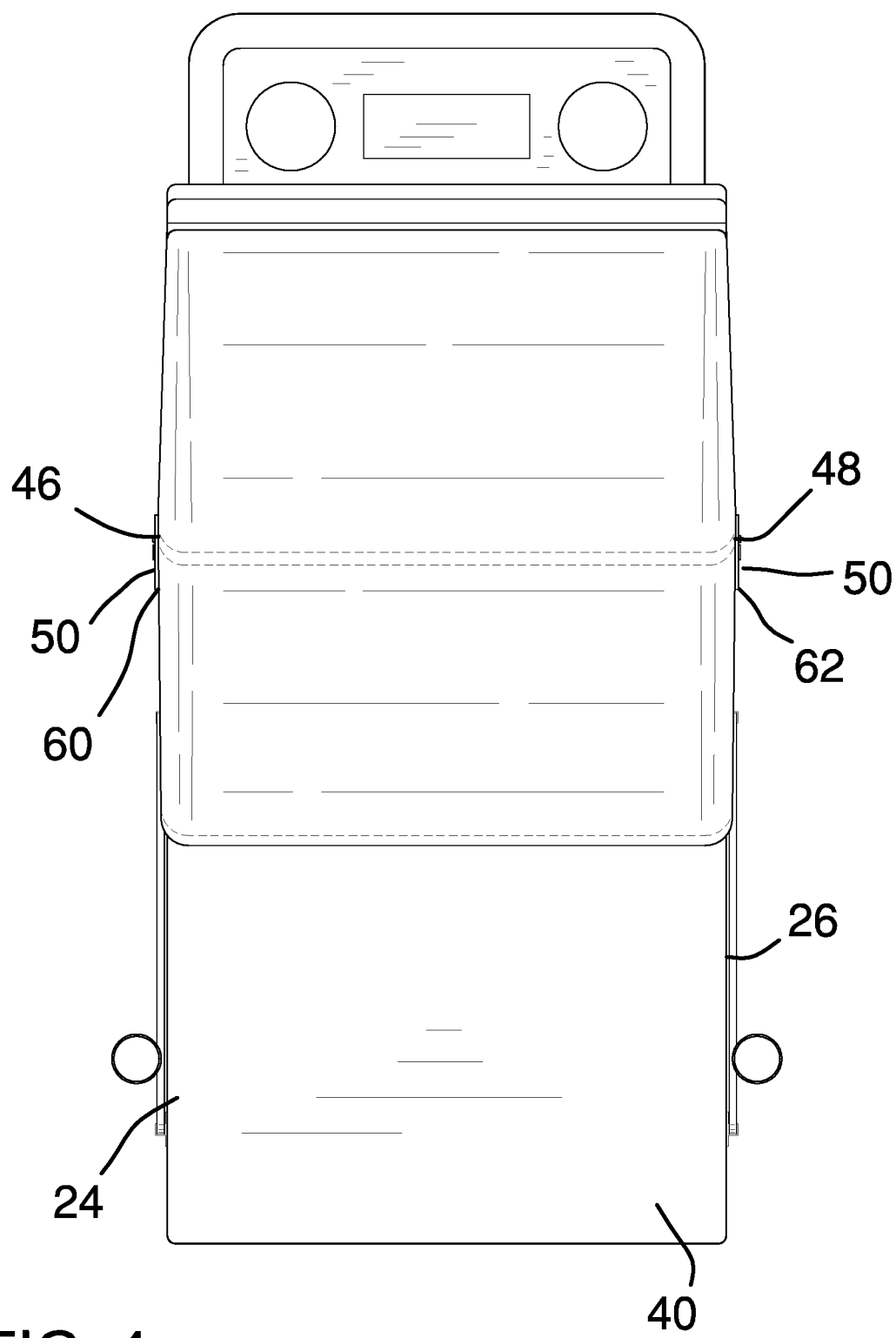
FIG. 4 is a top view of an embodiment of the disclosure.
Figure 5:
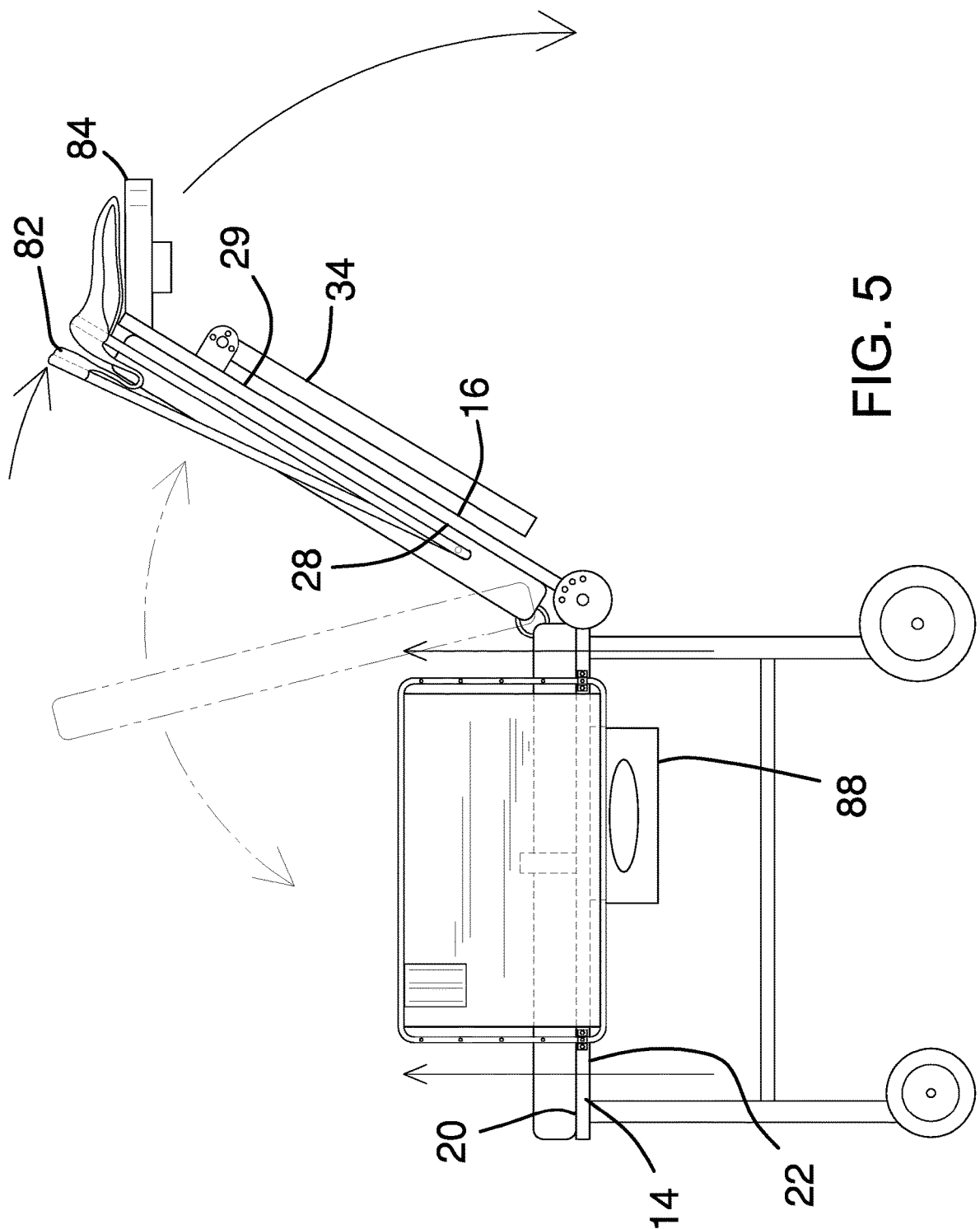
FIG. 5 is a left-side view of an embodiment of the disclosure showing a backrest being moved into a reclined position and showing a privacy panel being moved into a deployed position.
Figure 6:
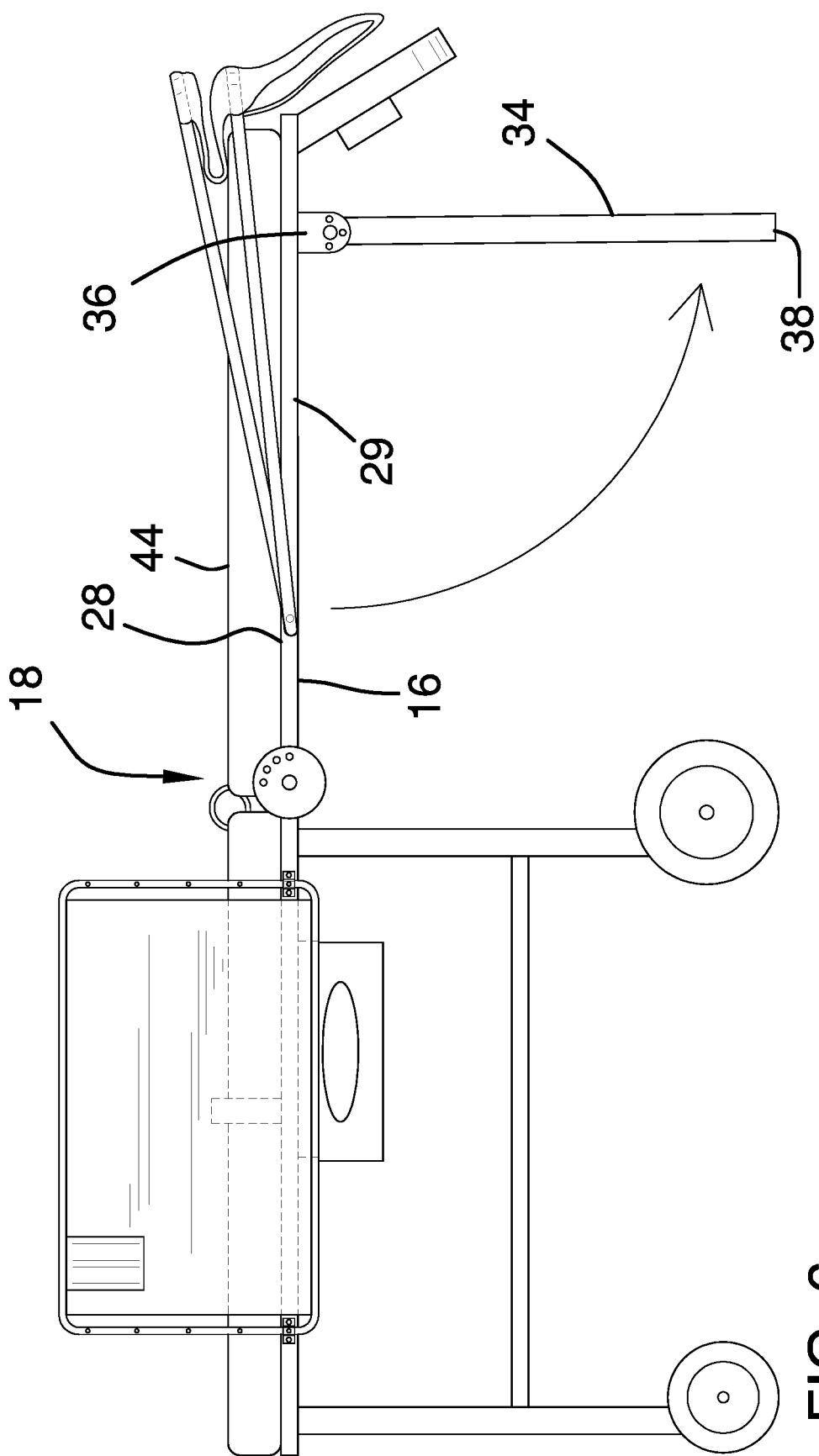
FIG. 6 is a left-side view of an embodiment of the disclosure showing a diaper table being formed and showing a pair of legs being positioned in a deployed position.
Figure 7:
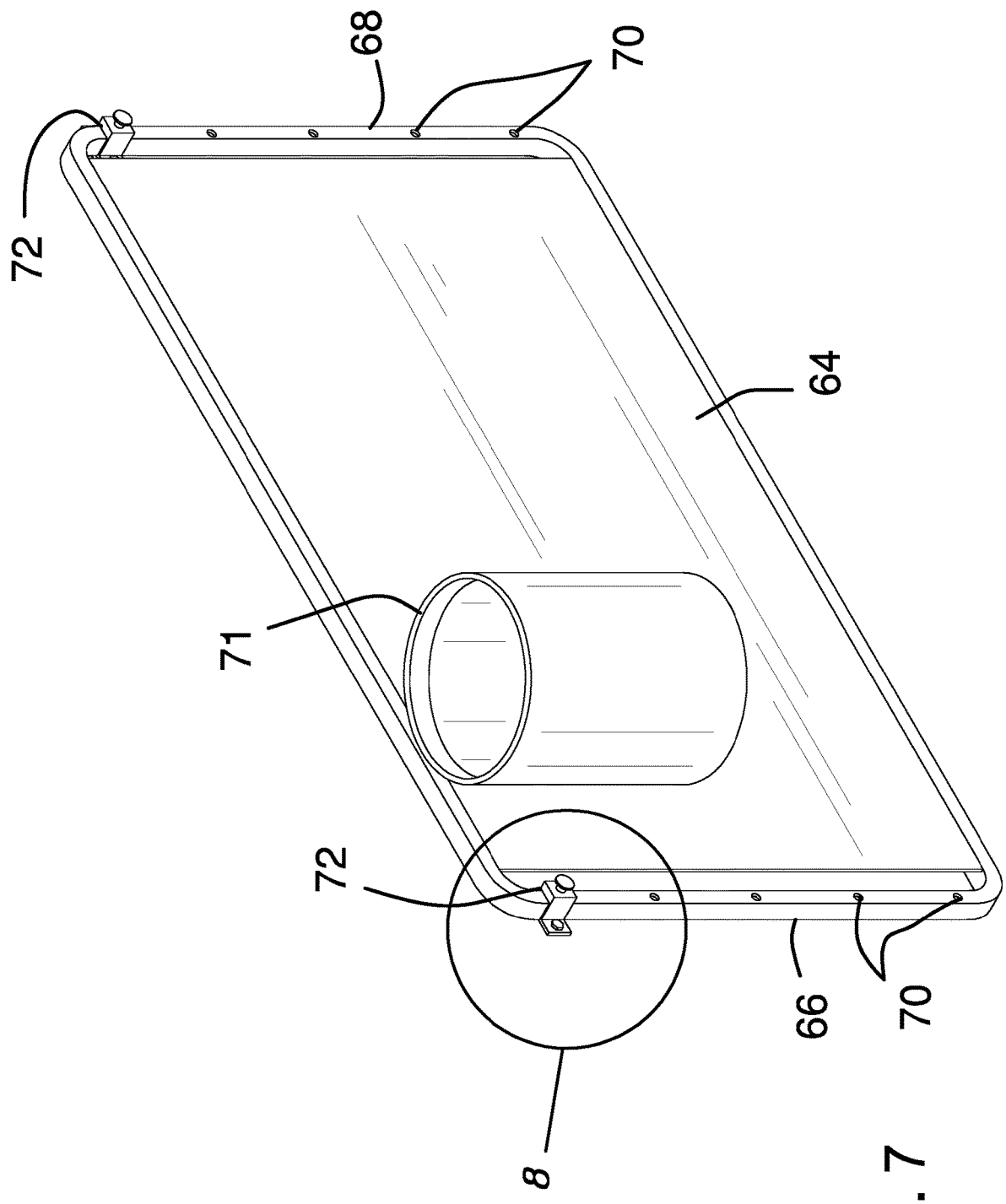
FIG. 7 is a perspective view of a privacy panel of an embodiment of the disclosure.
Figure 8:
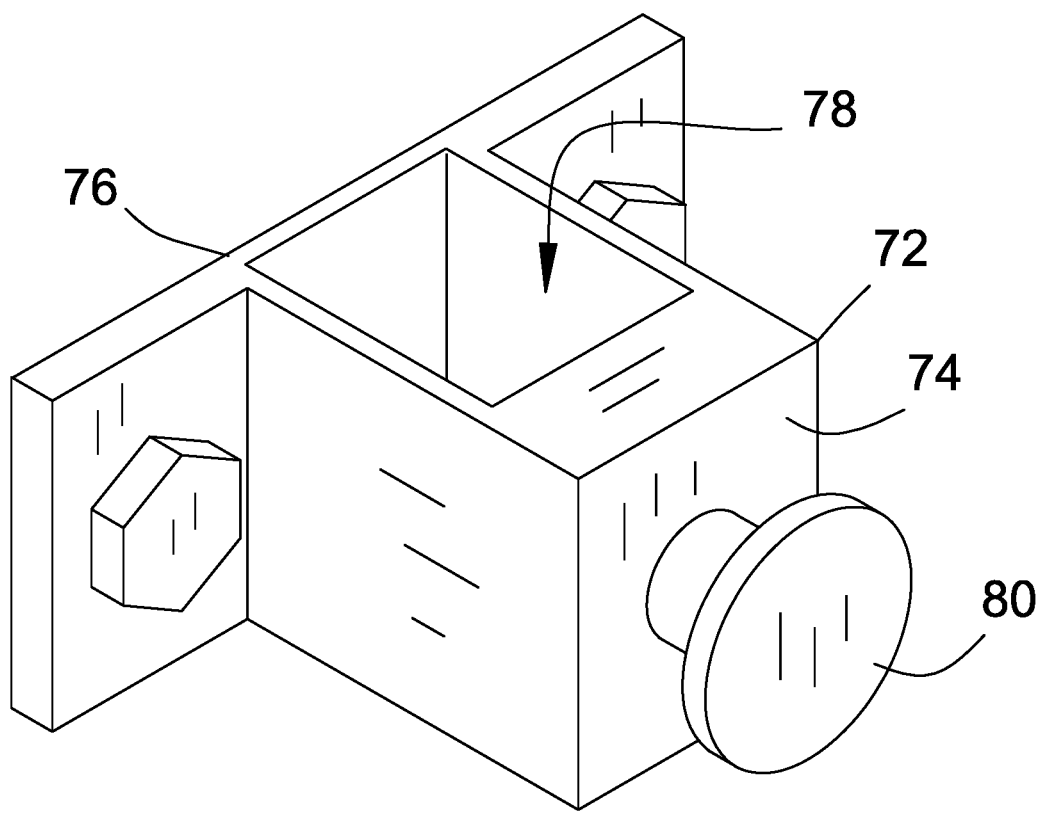
FIG. 8 is a detail view taken from circle 8 of FIG. 7 of an embodiment of the disclosure.
Figure 9:
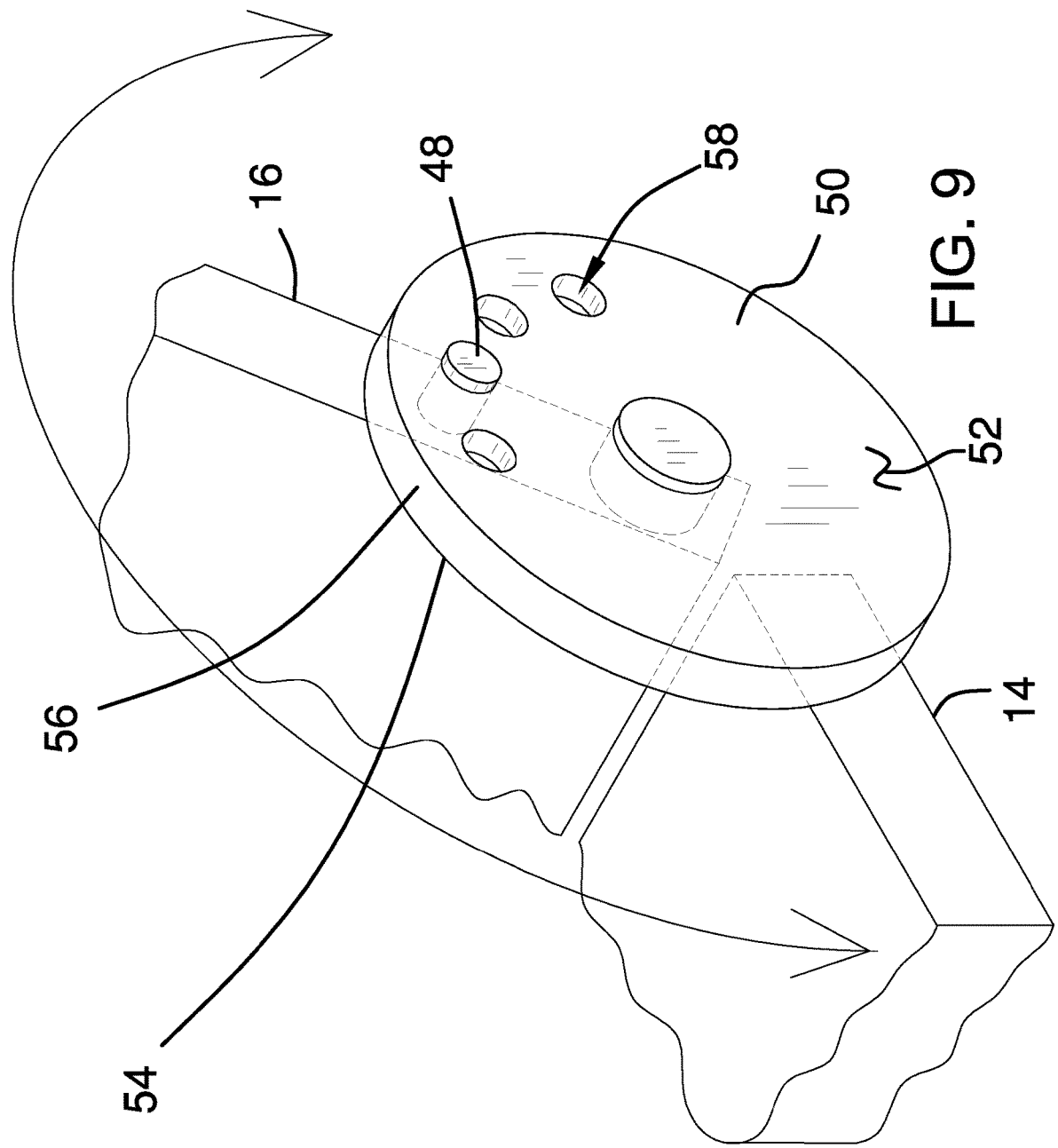
FIG. 9 is a detail view taken from circle 9 of FIG. 1 of an embodiment of the disclosure.

With reference now to the drawings, and in particular to FIGS. 1 through 9 thereof, a new stroller device embodying the principles and concepts of an embodiment of the disclosure and generally designated by the reference numeral 10 will be described. As best illustrated in FIGS. 1 through 9, the convertible stroller assembly 10 generally comprises a stroller 12 that has a seat 14 and a backrest 16 that is pivotally coupled to the seat 14. The backrest 16 is positional in an upright position such that the seat 14 and the backrest 16 may have an infant seated thereon. The backrest 16 is positional in a reclined position having each of the seat 14 and the backrest 16 forms a diaper changing table 18. In this way the seat 14 and the backrest 16 can have the infant laid thereon for changing a diaper. The stroller 12 includes a plurality of wheels, legs 34, and other structural components common to infant strollers.

The seat 14 has a top surface 20, a bottom surface 22, a first lateral edge 24 and a second lateral edge 26. The backrest 16 has a front surface 28, a back surface 29, a first lateral edge 30 and a second lateral edge 32. A pair of legs 34 is each pivotally coupled to the backrest 16 and each of the legs 34 is positional in a deployed position for supporting the backrest 16 when the backrest 16 is positioned in the reclined position. In this way the backrest 16 can support the weight of the infant. Each of the legs 34 has a first end 36 and a second end 38, and the first end 36 of each of the legs 34 is pivotally coupled to the back surface 29 of the backrest 16. Each of the legs 34 extends downwardly from the backrest 16 when the legs 34 are in the deployed position and the second end 38 of each of the legs 34 abuts the ground or other support surface. Additionally, each of the legs 34 lies against the backrest 16 when the legs 34 are positioned in a stored position.

A seat pad 40 is positioned on the seat 14 and the seat pad 40 is comprised of a resiliently compressible material. A belt 42 extends over the seat pad 40 and the belt 42 is matable to itself to form a closed loop for retaining the infant on the seat pad 40. In this way the belt 42 inhibits the infant from rolling off of the diaper changing table 18. A backrest pad 44 is positioned on the backrest 16 and the backrest pad 44 is comprised of a resiliently compressible material. A first pin 46 and a second pin 48 are each coupled to and extend away from a respective one of the first 24 and second 26 lateral edges of the backrest 16.

A pair of disks 50 is provided and each of the disks 50 has a first surface 52, a second surface 54 and a perimeter edge 56. Additionally, each of the disks 50 has a plurality of apertures 58 extending through the first 52 and second 54 surfaces. The apertures 58 in a respective one of the disks 50 are spaced apart from each other and are distributed along the perimeter edge 56 of the respective disk 50. The pair of disks 50 includes a first disk 60 and a second disk 62. The first disk 60 is coupled to the first lateral edge 24 of the seat 14 and the second disk 62 is coupled to the second lateral edge 26 of the seat 14. Each of the first 46 and second 48 pins engages a selected one of the apertures 58 in a respective one of the first 60 and second 62 disks to retain the backrest 16 at a selected angle with respect to the seat 14.

A pair of privacy panels 64 is each of the privacy panels 64 is slidably coupled to the seat 14. Each of the privacy panels 64 is positional in a deployed position having each of the privacy panels 64 extending upwardly from the seat 14. Each of the privacy panels 64 conceals the infant while the diaper is being changed. Additionally, each of the privacy panels 64 is positional in a stored position, and each of the privacy panels 64 includes a first lateral rail 66 and a second lateral rail 68. Each of the first 66 and second 68 lateral rails may each have a plurality of engagement points 70 thereon being distributed along an entire length of the first 66 and second 68 lateral rails. Each of the privacy panels 64 may have a cup holder 71 attached thereto for holding a beverage cup.

A plurality of receivers 72 is each coupled to the stroller 12 and each of the receivers 72 slidably engages a respective one of the privacy panels 64 for slidably retaining the privacy panels 64 on the stroller 12. Each of the receivers 72 has a front wall 74 that is spaced from a back wall 76 to define a slot 78 extending between the front 74 and back 76 walls. The back wall 76 of each of the receivers 72 is coupled to the stroller 12 such that an axis extending through the slot 78 is vertically oriented. The slot 78 in each of the receivers 72 slidably receives a respective one of the first 66 or second 68 lateral rails of the respective privacy panel 64 such that the privacy panels 64 can be raised and lowered in the receivers 72. A plurality of screws 80 each extends through the front wall 74 of a respective one of the receivers 72. Each of the screws 80 engages the respective first 66 or second 68 lateral rail 8 of the respective privacy panel 64 when the screws 80 are tightened for retaining the privacy panels 64 at a selected position. Additionally, each of the screws 80 may engage a selected one of the engagement points 70 in the respective first 66 or second 68 lateral rail.

A canopy 82 is provided and the canopy 82 is foldably coupled to the backrest 16. The canopy 82 is positional in a deployed position for shading the infant when the infant is seated in the stroller 12. Additionally, the canopy 82 is positional in a stored position prior to positioning the backrest 16 in the reclined position. A tray 84 is attached to a rear edge 86 of the backrest 16 and the tray 84 is oriented at an angle with the back surface 29 of the backrest 16. Moreover, the tray 84 is oriented to lie on a horizontal plane when the backrest 16 is positioned in the upright position. In this way the tray 84 can be gripped for pushing the stroller 12. The tray 84 may include cup holders and storage wells. A storage box 88 for moistened wipes is coupled to the bottom surface 22 of the seat 14 for storing moistened wipes for changing diapers.

In use, the backrest 16 is positioned in the upright position for employing the stroller 12 to transport the infant in the conventional means of employing a stroller 12. Each of the legs 34 is positioned in the deployed position and the backrest 16 is positioned in the reclined position when the infant needs a diaper change. In this way the diaper changing table 18 is formed. Each of the privacy panels 64 is positioned at a selected height for concealing the infant when the diaper is being changed. The backrest 16 is positioned in the upright position when the diaper has been changed for continuing to transport the infant in the stroller 12.

Figure 10:
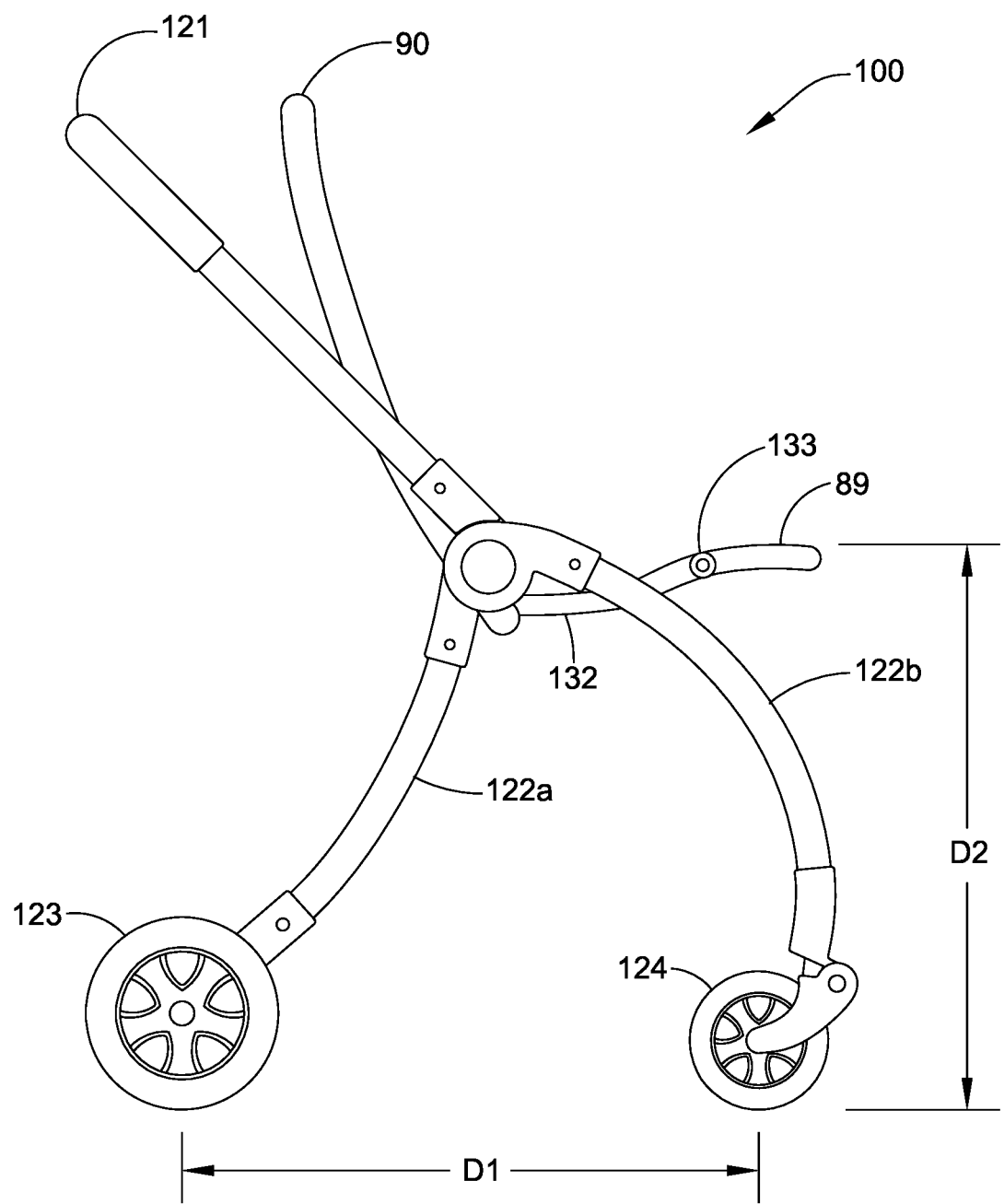
FIG. 10 is a right-side view of a stroller frame stabilized for safety according to an embodiment of the present invention.

FIG. 10 is a right-side view of a stroller frame 100 according to an embodiment of the present invention. Frame 100 includes a rear leg tube 122a and a front leg tube 122b. The front leg tube 122b presents on the outside of rear leg tube 122a relative to tube alignment over a frame cross member at center drawing that the tubes are mounted over. However, in one embodiment the reverse may be true without departing from the spirit and scope of the present invention.

Rear leg tube 122a and front leg tube 122b may be fabricated of steel or aluminum tubing that is formed as in a form bending process to have an arcuate profile. The arcuate design for the leg tubes provides for a more shock absorbent frame relative to vertical shock force. Front leg tube 122b includes a pair of front wheels 124 (one visible). Rear leg tube 122a includes a pair of rear wheels 123 (one visible).

Front wheels 124 may be smaller in diameter than rear wheels 123. Front wheels 124 may turn freely while rear wheels 123 may be axle mounted on a fixed axle that cannot be turned relative to the line of the stroller. Stroller frame 100 includes additional frame support cross members (not visible in this view) proximal to the lower ends of the front leg tubes and the rear leg tubes.

Stroller frame 100 includes a molded backrest 90 and a stroller control handle tube 121. Both the seat molded backrest 90 and the stroller control handle tube 121 are seated at the main frame cross member (127 FIG. 11) that the front and rear leg tubes are seated to. While the positions of front leg tube 122b and of rear leg tube 122a are fixed relative to one another, the positions of molded backrest 90 and stroller control handle tube 121 may pivot in a controlled manner about the main frame cross member. Seat 132 may also engage the cross member mentioned above. Seat 132 may have a footrest 89 rotatably attached at a distal end of the seat via hinge 133.

A wheelbase dimension D1 reflects the length of the wheelbase of stroller 100 from center line-to-center line of the wheels (rear to front). In a preferred embodiment, D1 is approximately 45-75 centimeters (cm), in this embodiment, 66.2 cm. A seat height D2 reflects the elevation of the molded plastic seat bottom 103 of the stroller above ground level. D2 is approximately 50-65 cm, in this embodiment it is 58 cm from ground to the top of seat 132. This orientation of wheelbase dimension and seat height is necessary to provide stability during positioning of the back rest and seat height required for comfort during changing of the passenger by the user.

It is noted herein that the center line of the main cross member at the apex of the arcuate leg tube profile is closer to the rear wheels 123 than to the front wheels 124. For example, the center line to center line dimension from the rear wheel 123 to the main cross member is within a range of 28-35 cm, in this embodiment approximately 30.2 cm whereas the center line-to-center line dimension from the front wheel 124 to the main cross member is within a range of approximately 32-38 cm. This dimensional consideration moves the center of gravity back toward the rear of the stroller providing more stability against a front facing tip over of the stroller while in use.

Figure 11:
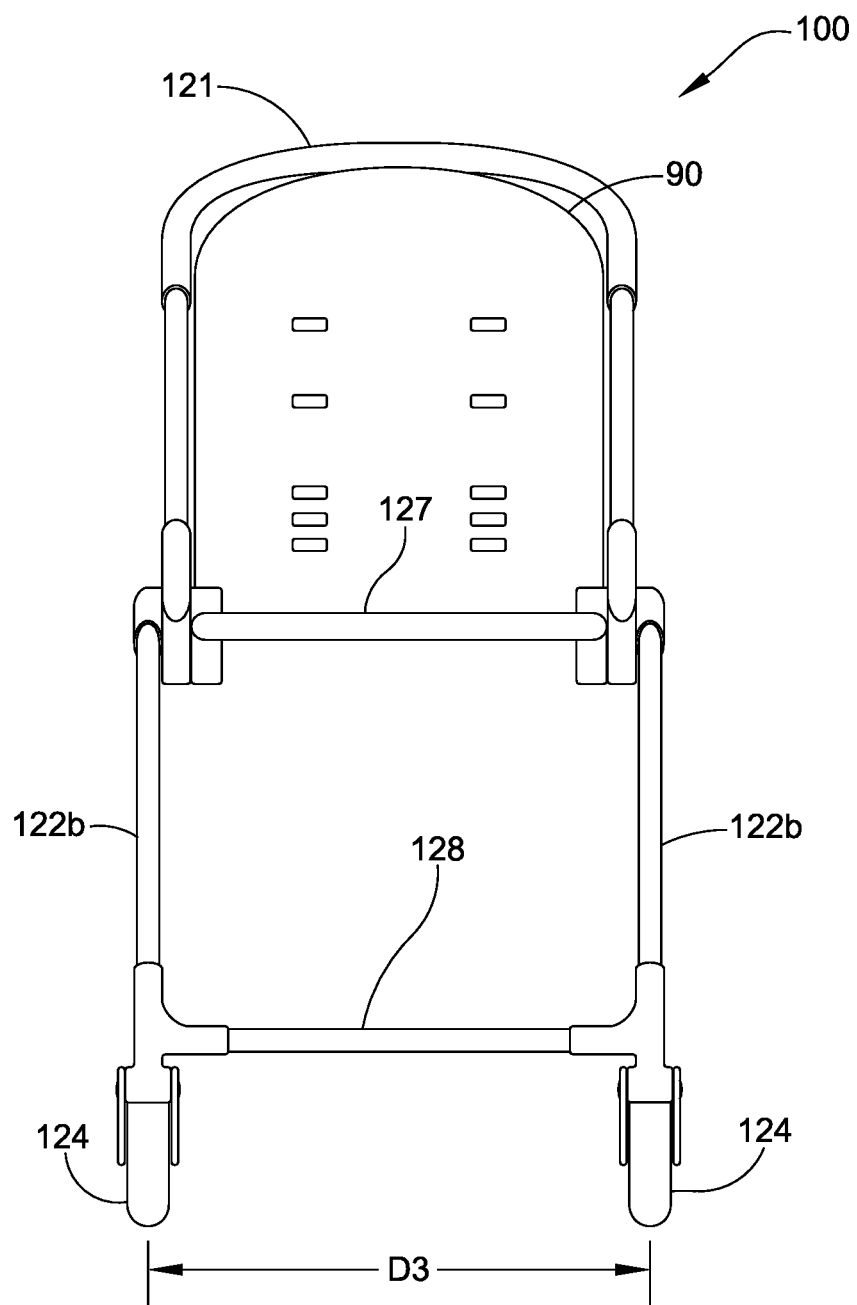
FIG. 11 is a front view of the stroller frame of FIG. 10.

FIG. 11 is a front view of the stroller frame 100 of FIG. 10. In this view, the main cross member 127 is visible (upper cross member), and the lower support cross member 128 (lower cross member) is visible extending between front wheels 124. Wheels 124 are visible in this view while rear wheels 123 are not depicted in this view. This front view assumes that the width dimension D3 of the wheelbase measured from center line-to-center line across wheels 124 is substantially the same dimension across the rear wheels 123. However, that should not be construed as a limitation as the rear wheelbase width dimension may be significantly wider than the front wheelbase width dimension D3 without departing from the spirit and scope of the invention and may be preferred in most embodiments. D3 may be within 35-56 cm, in this embodiment about 50 centimeters across the front wheels 124 from center line-to-center line.

Figure 12A:
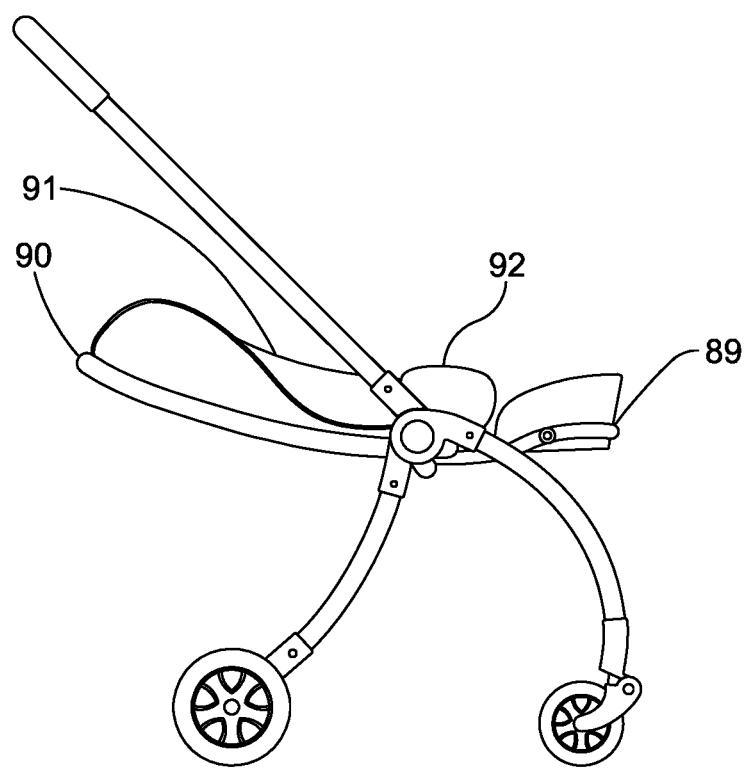
FIG. 12A is a right-side view of the stroller frame of FIG. 10 equipped with a seat and material privacy cover.

FIG. 12A is a right-side view of stroller frame 100 of FIG. 10 equipped with the footrest 89, a molded back rest 90, seat side covers 91, and material privacy panel covers 92. 12B is a front view of molded backrest 90, seat 132 and seat side covers 91 installed on stroller frame 100 of FIG. 12A. Referring first to FIG. 12A, stroller frame 100 supports a seat 132 that may be pivotally connected to a molded backrest 90. A pair of seat side covers 91 are provided and may be retained at least at one end onto a retaining post (not illustrated), the seat side covers 91 including a volume that houses a pair of privacy cover frame assemblies (not visible).

Figure 12B:
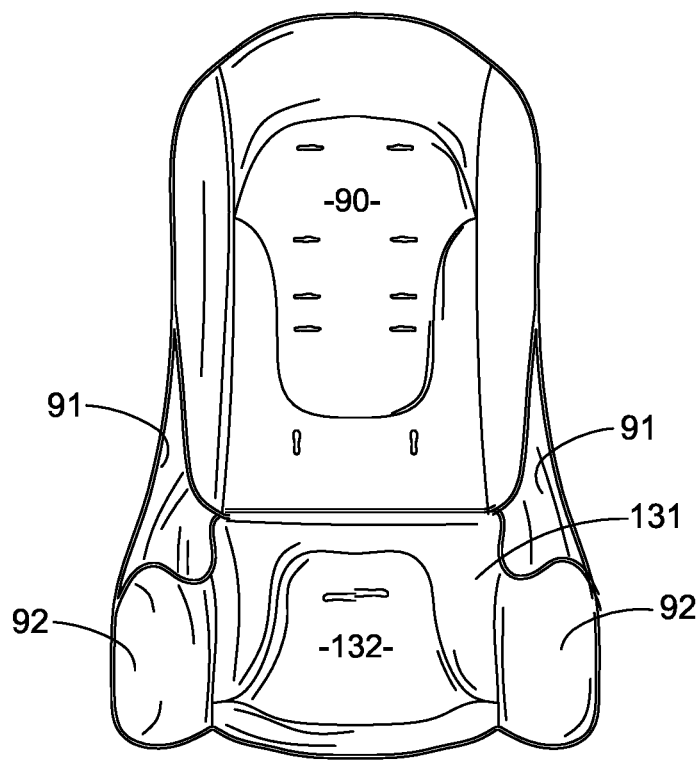
FIG. 12B is a front view of the seat and material privacy covers installed on the stroller frame of FIG. 12A.

Referring now to FIG. 12B, the seat side covers 91 are separate web like material covers positioned and retained between the panel covers 92 and the backrest 90. Each material privacy cover surrounds a frame sub assembly (FIG. 13A) that is adjustable to raise the privacy covers upward vertically or the collapse the privacy covers back downward to rest against the collapsed frame assemblies. Material cover 131 may be provided wherein 92, 91 may be integrated with material covering the seat 132 and 90.

Figure 13A:
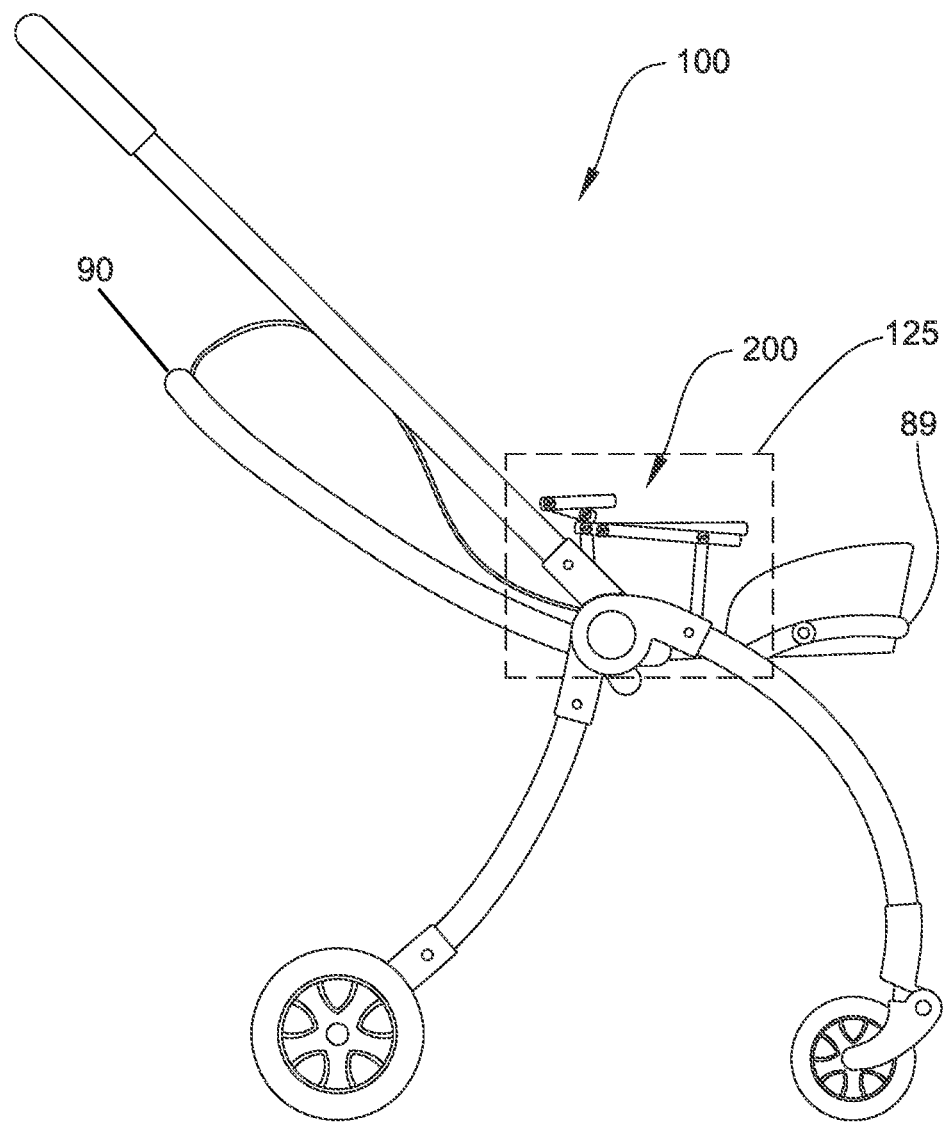
FIG. 13A is a right-side view of the stroller frame of FIG. 12A including the seat and privacy panel frame assembly of FIG. 12B and a privacy cover lift frame assembly.

FIG. 13A is a right-side view of the stroller frame 100 of FIG. 12A including the seat 132 and privacy covers 92 of FIG. 12B and a privacy panel frame assembly 200. In this view, backrest 90 is partially reclined. A privacy cover frame assembly 200 is provided in this embodiment and mounted to the bottom of seat 132. Privacy panel covers 92 are removed for purpose of clarity in description of the underlying privacy panel frame assembly 200. Detail box 125 isolates privacy panel frame assembly for further descriptive detail in the views presented below.

Figure 13B:
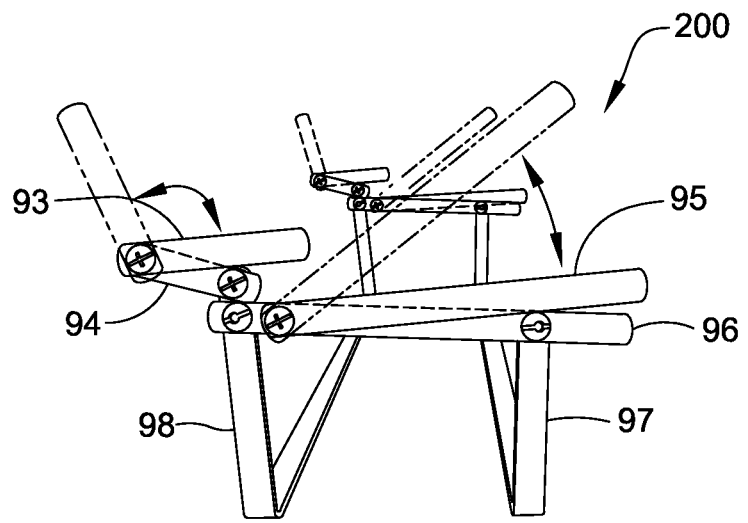
FIG. 13B is a perspective view of the privacy panel frame assembly of FIG. 13A.

FIG. 13B is a perspective view of the privacy panel frame assembly 200 enclosed in detail box 125 of FIG. 13A. Privacy cover frame assembly 200 is designed as a separate, add-on sub assembly that is secured to the bottom of the stroller seat 132 using conventional hardware. The sub assembly is fabricated from 12 mm wide×3 mm thick flat aluminum bar stock. Privacy panel frame assembly 200 includes a front frame member 97 and a rear frame member 98. Frame members 97 and 98 are oriented orthogonally to the longitudinal line of the stroller seat 132 and support a pair of sub-assemblies that are materially covered by the privacy covers 92 anchored at least by a retaining post, the sub-assemblies adjustable at each side of the stroller seat.

Privacy panel frame assembly 200 includes a pair of cross-frame support members 96 that provide rigidity to the frame. Privacy panel frame assembly 200 includes a pair of front links 95 that are attached at one end to cross-frame support links 96 at the outside surfaces just forward of rear frame member 98. The opposite ends of front links 95 are free ends. Front links 95 are adapted to be pivotal about the attachment points to the cross-support members 96 and may be raised up from a relative horizontal first position up to 90 degrees relative to the horizontal cross-frame members according to the direction of the double arrow depicting the range of pivot.

Privacy panel frame assembly 200 further includes a pair of rear link support members 94. Rear link support members 94 also referred to as support links 94 are attached at one end to rear frame 98 on the outsides of the frame just above the attachment points for the cross-frame support members. Support links 94 are connected at the opposite ends to rear links 93. Rear links 93 are adapted to be pivotal about the attachment points with support links 94 and may be raised up from a relative horizontal first position past 90 degrees relative to the support link according to the direction of the double arrow depicting the range of pivot. In this embodiment one side may be adjusted independently from the other side of assembly 200.

Figure 13C:
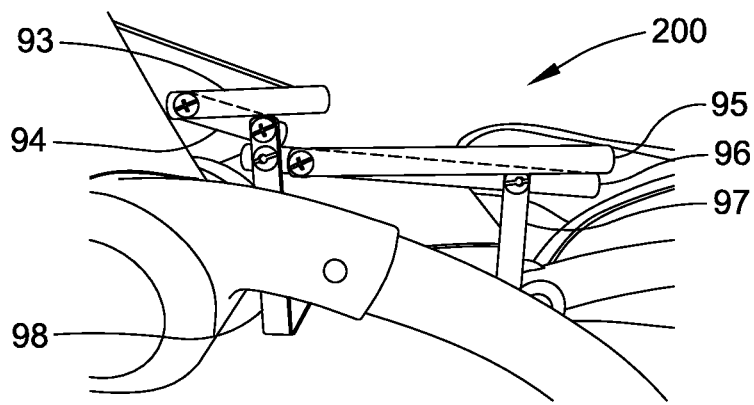
FIG. 13C is a partial perspective view of the privacy panel frame assembly of FIG. 13A folded down.

FIG. 13C is a partial perspective view of the privacy panel frame assembly of FIG. 13A folded down. In this view, front link 95 and rear link 93 are depicted in a collapsed state relatively horizontal or presenting a slight angle of elevation above the horizontal cross-frame member 96 and the near horizontal rear link support member 94. In this state the apparatus is collapsed so the privacy material is also collapsed. It is noted herein that front link 95 is significantly longer that rear link 93.

It is noted herein that the very top edge of the privacy cover (general descriptive term) of assembly 200 with material privacy covers 92 installed ranges from 100-150 millimeters above the molded plastic seat 132 of FIG. 10 when in the lower adjustment position. Height may alternatively be measured from the horizontal seat surface of seat 132 and is about 90 millimeters (4.7 in.) from that surface but may vary. The very top edge of the privacy cover (general descriptive term) of assembly 200 with material privacy covers 92 installed is within a range of 150-200 millimeters above the seat 132 of FIG. 10 when in the higher adjustment position.

Figure 13D:
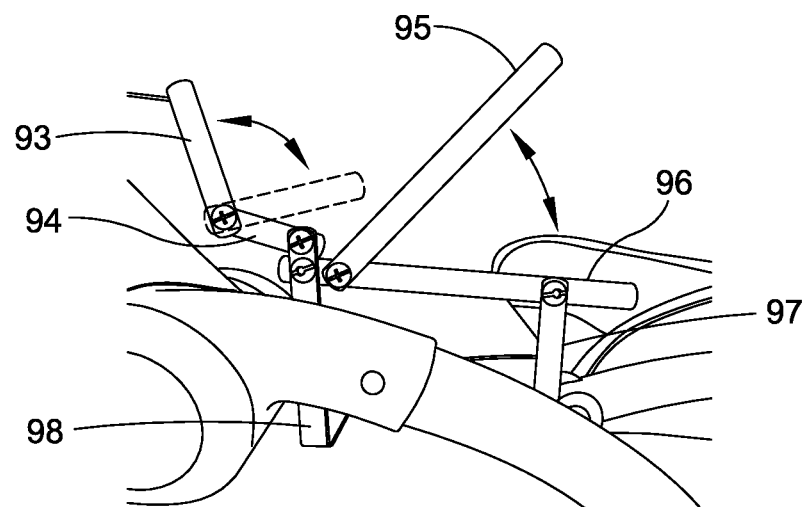
FIG. 13D is a partial perspective view of the privacy panel frame assembly of FIG. 13A folded up.

FIG. 13D is a partial perspective view of the privacy cover frame assembly of FIG. 13A partially raised. In this view, front link 95 is only partially raised as is indicated by the directional arrow and broken boundary depicting prior position. In this view rear leg 93 is fully raised. The privacy cover frame assembly is designed as a separate, add-on frame that may be secured to the bottom of the stroller seat. The frame assembly is constructed from flat aluminum bar stock having a width and thickness compatible with requirements for frame construction including a range of about 10-15 mm wide and 2-5 mm thick. In this embodiment, the bar stock is from 12 mm wide×3 mm thick flat aluminum bar stock. It is noted that measurements of the bar stock are not limited by these measurements and may very as long as integration and movement is maintained.

Figure 14:
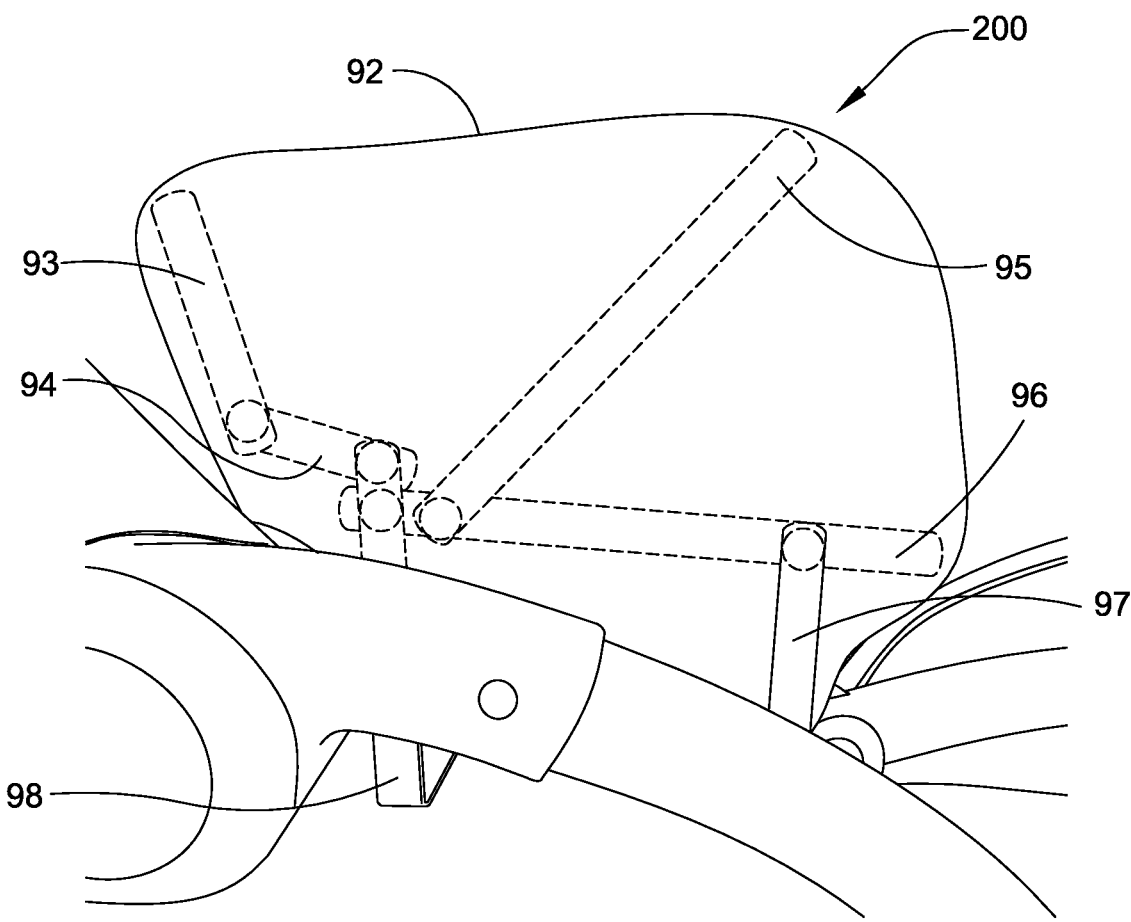
FIG. 14 is a partial perspective view of the privacy panel frame assembly of FIG. 13A covered with material and folded up according to an embodiment of the invention.

FIG. 14 is a partial perspective view of the privacy panel frame assembly 200 of FIG. 13A covered with material and raised according to an embodiment of the invention. In this view, privacy covers 92 are installed over privacy panel frame assembly 200. Material privacy covers 92 may cover the entire side of each sub assembly hiding the links, cross frame supports, and the front and rear frame members 97 (front) and 98 (rear). Material covers may be fabricated from material that is this and durable to the point that the fabric, itself, does not get caught in pivot points or between the links, yet is still pliable enough to raise and collapse when required. In one embodiment a thin foam layer or padding may be added to fabric comprising material privacy covers 92.

Figure 15:
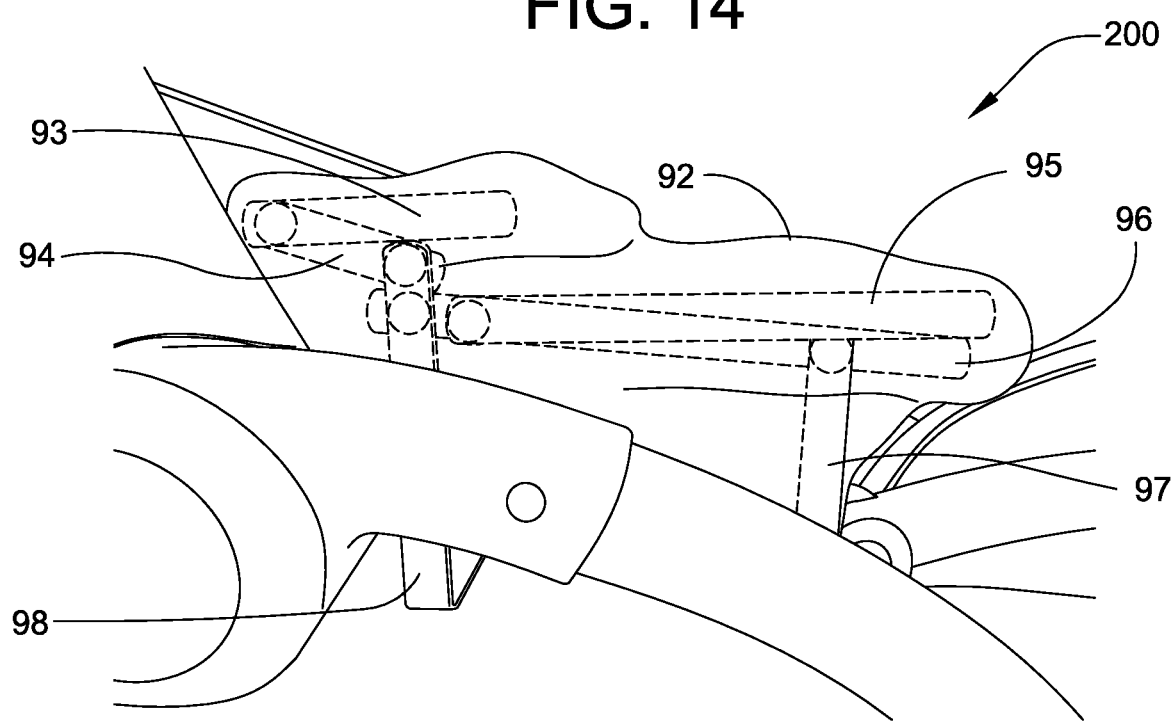
FIG. 15 is a partial perspective view of the privacy panel frame assembly of FIG. 13A covered with material and folded down according to an embodiment of the invention.

FIG. 15 is a partial perspective view of the privacy frame assembly of FIG. 13A covered with material and folded down according to an embodiment of the invention. In this view, the privacy covers are depicted collapsed over the down-folded privacy panel frame assembly 200. The frame assembly 200 may be attached to the bottom of the stroller seat using standard hardware such as rivets, spacers, and screws, snap seats, and other methods. The privacy panel frame assembly 200 is height-adjustable from a lower position to a higher position to provide more privacy when changing a diaper.

A user may manually raise, and lower material privacy covers as desired. In one embodiment privacy panel frame assembly 200 may be retained rigidly or locked into a higher position and retained or locked at the lower position by virtue of manipulating the frame sub-assemblies 200. In one embodiment retaining posts are provided and secured to the backrest 90 or handle frame member 121 to retain privacy covers 92 at one corner. In this embodiment, a sewn fabric retaining loop may be included at the top rear corner of the material privacy cover 92 to secure privacy panels to the retaining posts. In one aspect, the folded length of the retaining loop may be approximately 25 mm (1 in.). In this embodiment, one may convert the stroller frame into a changing table by pivoting the backrest 90 and Another goal of the invention is to provide a safe and secure means to secure a child on a changing table surface of the stroller such as by use of shoulder straps.

Figure 16:
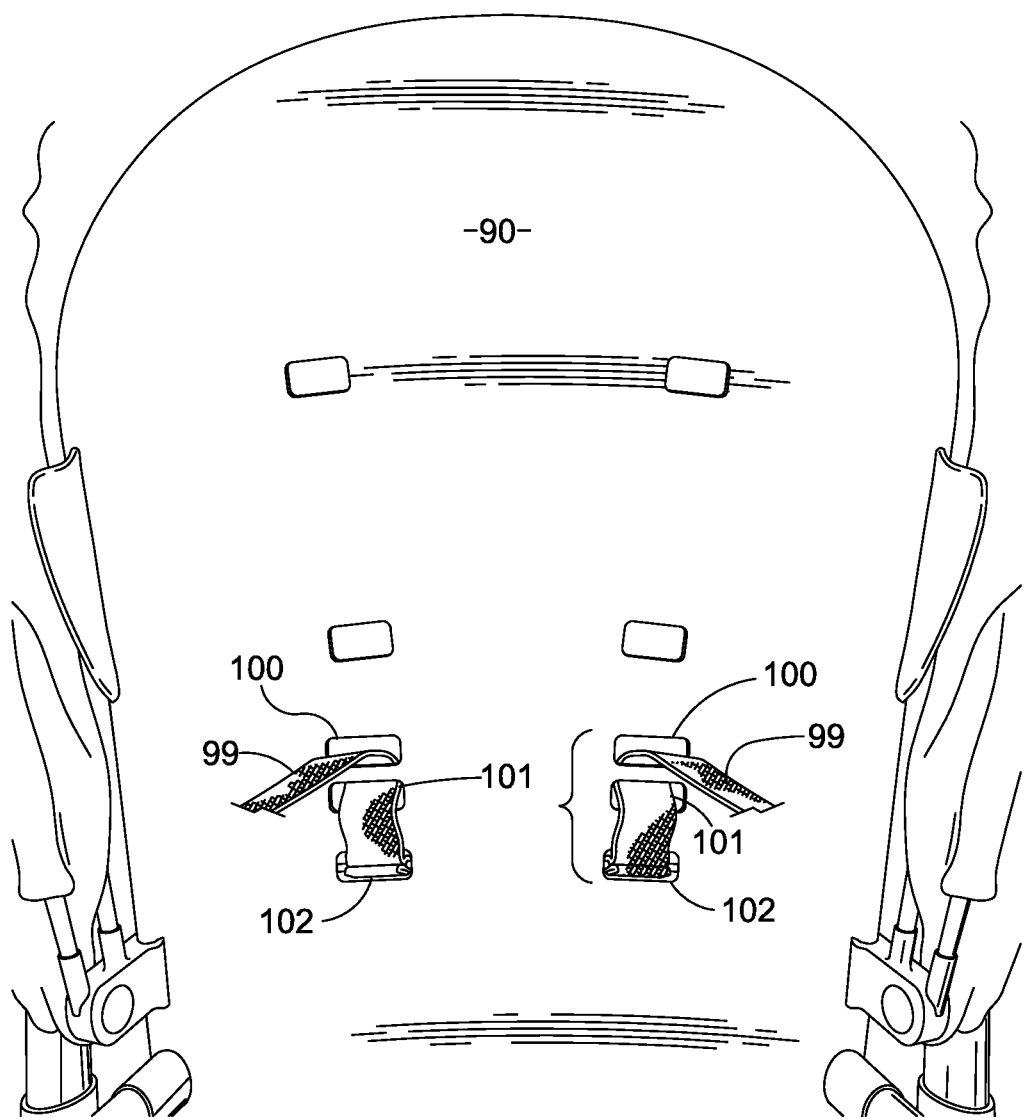
FIG. 16 is a front view of a molded seat back with slots for a shoulder belt.

FIG. 16 is a front view of molded backrest 90 with slots for a shoulder belt. Molded backrest 90 is pivotally attached together with the seat 132 of FIG. 10 and may be articulated enabling a substantially horizontal surface to allow the stroller to be used as a diaper changing table.

Molded backrest 90 includes an array of slots arranged in two columns of five slots each. Slots reserved for shoulder belts to secure a child to the changing table are slots 100 (upper slot), 101 (middle slot), and 102 (lower shoulder belt slot). Slot sets 100, 101, and 102 are positioned strategically from the seat surface up molded backrest 90.

In this view, a shoulder belt 99 is provided and adapted to be anchored at one end in line with lower shoulder belt slot 102 and to be routed in through lower shoulder belt slot 102. Shoulder belt 99 is routed back through upper slot 101 (next highest set), and then back in through upper slot 100 (next highest set from set 101). The shoulder belt 99 prevents a baby from turning over or sitting up during the time a diaper is being changed.

Figure 17:
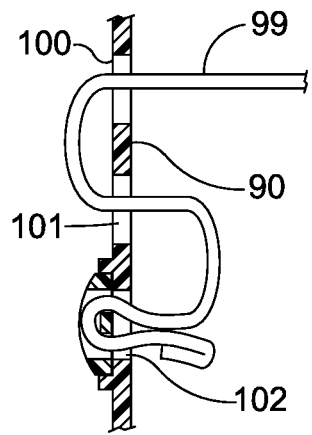
FIG. 17 is a magnified side view sectioned to depict the shoulder belt configuration through the slots in the molded seat back of FIG. 16.

FIG. 17 is a magnified side view of the shoulder belt configuration of shoulder belt 99 as shown inside the bracket of FIG. 16. In this view, shoulder belt 99 is anchored at lower shoulder belt slot 102 from behind the padded material depicted with section lines. Belt 99 comes through lower shoulder belt slot 102 and is routed back through middle slot 101 and then back through upper slot 100 on backrest 90.

Pop-Up Privacy Panels and Operation

A goal of the present invention is to provide a design for a pair of privacy panels integrated into the stroller material at opposing sides of the seat of the stroller that are higher and give more privacy to a user and an infant having a diaper changed. Another goal of the present invention is to provide a means to pop up the privacy panels when needed and to collapse the privacy panels when not required without requiring additional tasks apart from unfolding the stroller and folding the stroller.

Figure 18:
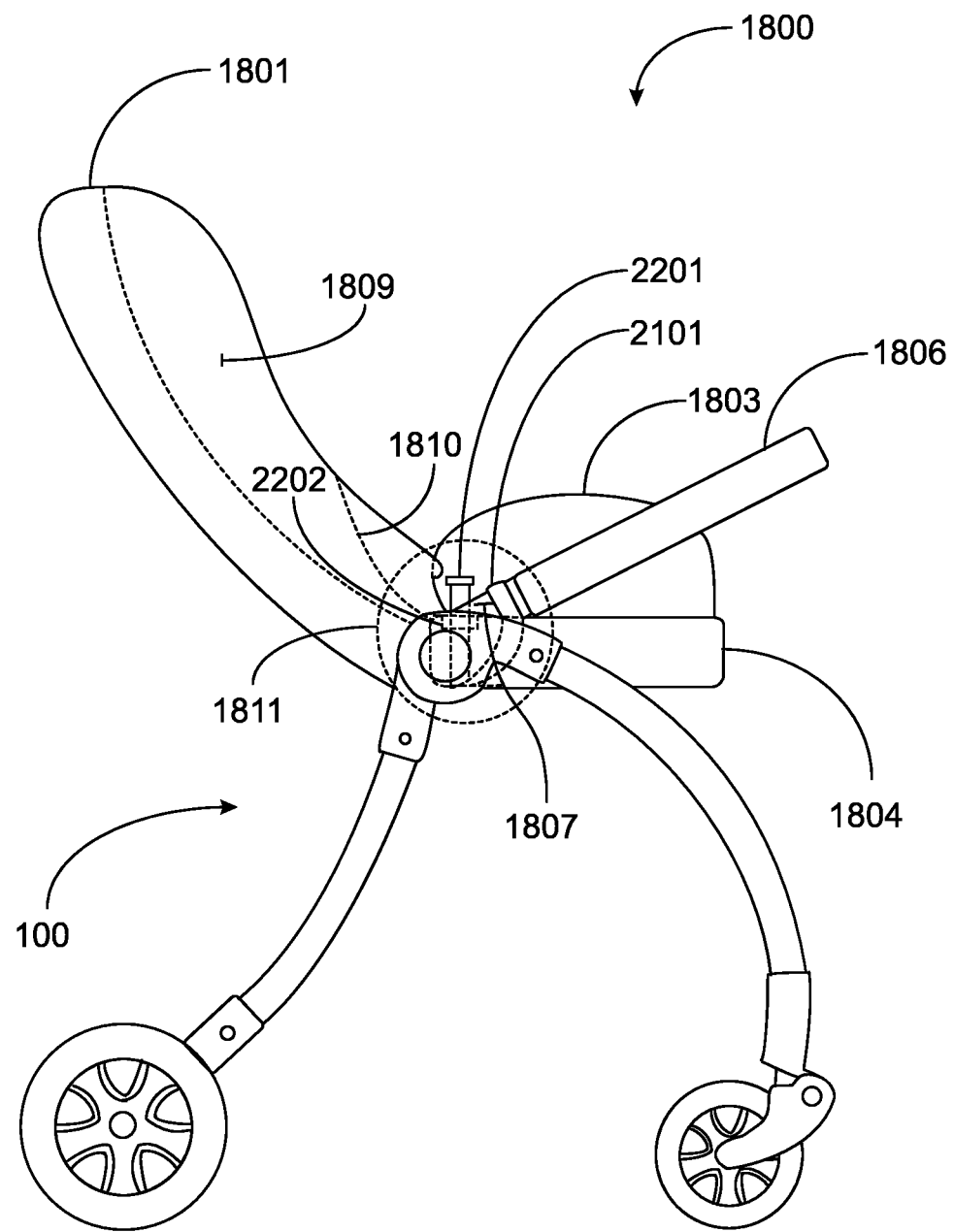
FIG. 18 is an elevation view a convertible stroller with pop-up privacy panels according to an embodiment of the present invention.

FIG. 18 is an elevation view of convertible stroller 1800 with pop-up privacy panels according to an embodiment of the present invention. Stroller 1800 may be similar in construction and materials as stroller 100 introduced in FIG. 10 above with the exception of a pair of privacy panels 1803 (one visible) that replace frame assemblies 200 introduced in FIG. 13A above.

Privacy panels 1803 are solid panels that are encapsulated in material such as an upholstered product and shaped to a rounded rectangular or arcuate form having a stock overall length and stock overall height which is static and not adjustable. Privacy panels 1803 may be formed of a rigid material like plastic or sheet metal having a material thickness large enough to resist bending, warping, or twisting. The panels are encased within or encapsulated by a durable material that may include stiff padding material on both sides of the panel members. The privacy panels 1803 may be upholstered wherein the panel is covered with padding and material.

Privacy panels 1803 are generally positioned on opposing sides of a stroller seat bottom 1804 and are sewn to the seat bottom cover material and are allowed to fold flat against seat bottom 1804 when stroller 1800 is folded into a closed position for storage, the privacy panels folded flat against the seat bottom with the stroller back rest 1801 folded down on top of them.

In a preferred embodiment, a pull strap system is employed to automatically pull the privacy panels upward from a folded position to a generally vertical position, the outside surfaces of the panels resting against a stroller arm bar referenced herein as arm bar 1806. Arm bar 1806 may be a curved tubular piece that is removable from stroller 1800 and may attach to a pair of arm bar base tubes 1807 connected to the stroller frame near the rear of seat bottom 1804 at both sides (backside not shown). A pliable pull strap 2101 is provided having a length a width and a material thickness. Pull strap 2101 may be attached to the outside surface of privacy panel 1803 below vertical center and toward the rear. In one embodiment, the pull strap is sewn at one end to the panel material providing an anchor point 2201 for the strap to pull the privacy panel up into vertical use position.

The stroller platform including a back rest 1801 connected to a seat bottom 1804 are fitted to stroller frame 100 wherein the backrest 1801 may be adjusted from vertical to horizontal to form a changing table. Stroller 1800 may be folded for storage and unfolded for use. Privacy panels 1803 fold down when the stroller is folded up for storage and pops up when a user unfolds the stroller for use. In one embodiment, the stroller platform includes a footrest portion that is introduced and depicted in FIG. 12A as footrest 89. A footrest is not required to practice the present invention.

In a preferred embodiment, arm bar 1806 extends to a length sufficient to clear the front facing edges of privacy panels 1803 to prevent inadvertent contact between the panels and the bar structure. In one embodiment, arm bar 1806 may be adjusted angularly in reference to the generally horizontal position of seat bottom 1804. It may be appreciated that the stroller platform including back rest 1801 and seat bottom 1804 may be covered or upholstered using a durable fabric material. Likewise, materials designed to store items may be assumed present in this embodiment. When the back rest 1801 is articulated down angularly to form a near horizontal angle with the bottom seat 1804 to create a changing table, privacy panels 1803 remain vertical. Back rest 1801 may include a side rim 1809 that extends out from the back rest 1801 on both sides and, in one embodiment, across the top of the back rest 1801.

Seat bottom 1804 includes a pair of elongate slots 2202 provided through the material of the seat bottom breaking out underneath the seat bottom 1804. Detail 1811 depicts one slot in broken boundary placed near the edge of the seat bottom 1804 and running generally longitudinally with the stroller platform seat bottom 1804. The slots 2202 are spaced apart in alignment one slot per side of the seat bottom. Pull strap 2101 may be routed into slot 2202 from anchor point 2201 and then routed toward the near edge of the seat bottom 1804, up around the edge to the proximal arm bar base tube 1807 and connected to the base tube, or over the base tube. The configuration may be duplicated at both sides of stroller 1800.

In one embodiment, pull strap 2101 includes a loop sewn at the free end having a large enough diameter to loosely fit over the outside diameter of the arm bar base tube 1807. In this configuration, privacy panels 1803 pop up when a user unfolds the stroller thus unfolding the stroller platform for use. Panels 1803 fold down and lie prone against the top surface of seat bottom 1804 when the stroller is again folded for storage. In one embodiment, pair of top seams 1810 are provided in the material sidewall 1809 of backrest 1801 from a point on the top of the sidewall in a lower region of the back rest, the seams angling downward to the seamed edge of bottom seat 1804 and backrest 1801. In this way fold lines are created whereby when folding the stroller 1800, the lower edges of the sidewall 1809 contact the upper rear corners of privacy panels 1803 helping to urge the panels inward. These angular regions at the bottom of sidewall 1809 maybe stiffened modestly by inserting appropriately cut plastic sheet material (not visible) between padding materials up to the top seams 1810. More detail about the pull strap system leveraging pull straps 2101 is provided further below.

Figure 19:
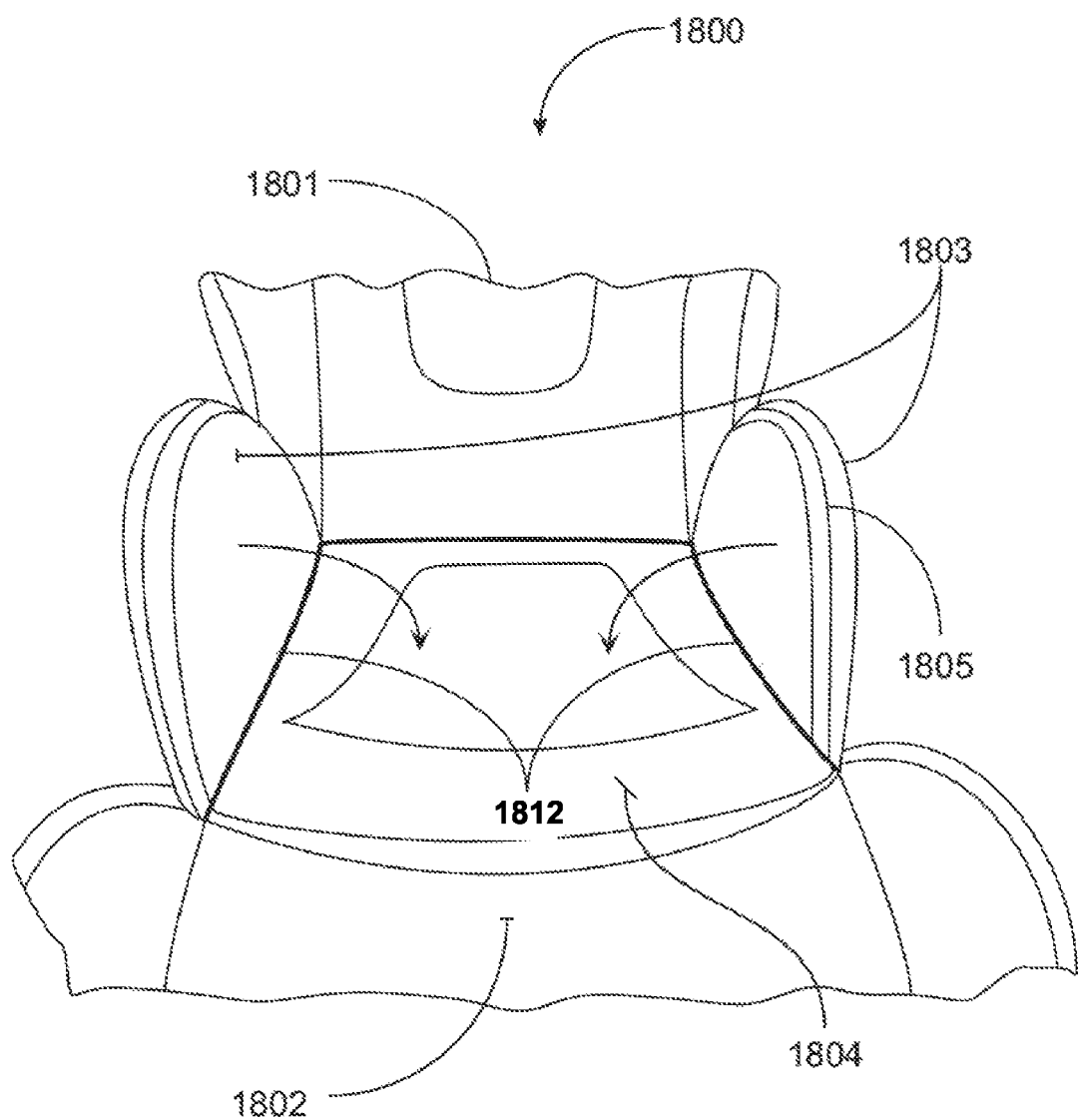
FIG. 19 is a partial front elevation view of the stroller of FIG. 18 with pop-up privacy panels in the upright position.

FIG. 19 is a partial front elevation view of stroller 1800 of FIG. 18 with pop-up privacy panels in the upright position. In this view privacy panels 1803 are positioned vertically relative to the seat bottom 1804 as a result of the stroller being unfolded from a storage position. Panels 1803 may be folded down flat against seat bottom 1804 in the direction of the arrows when the stroller is folded back into a storage position. In this embodiment, each privacy panel has a top seam 1805. Also, in this embodiment, pair of double stitched seams 1812 are provided to secure privacy panels down to the opposing material edges of the upholstered seat bottom 1804. A double seam 1812 may also be provided between the backrest 1801 and seat bottom 1804.

In this embodiment, privacy panels 1803 are sewn at the bottoms thereof to the edge material of seat bottom 1804 with stitched seams 1812. The seam between the privacy panel and the seat bottom is reinforced and the seat bottom width is reduced slightly to allow enough gap space between the seat hard edges and the panel edges for the panels to easily fold down without interference into a folded position flat against the seat bottom 1804. Privacy panels 1803 extend to a footrest portion 1802 of stroller 1800 materially attached to the front edge of bottom seat 1804. Footrest 1802 may be analogous to footrest 89 of FIG. 12A further above.

In this example the top of privacy panels 1803 are somewhat arcuate across the length of the panel. In another embodiment, the panels 1803 may be more rectangular in form with less-rounded corners; the more rectangular panels may be the same height vertically as the more arcuate panels 1803 without departing from the spirit and scope of the invention.

Figure 20:
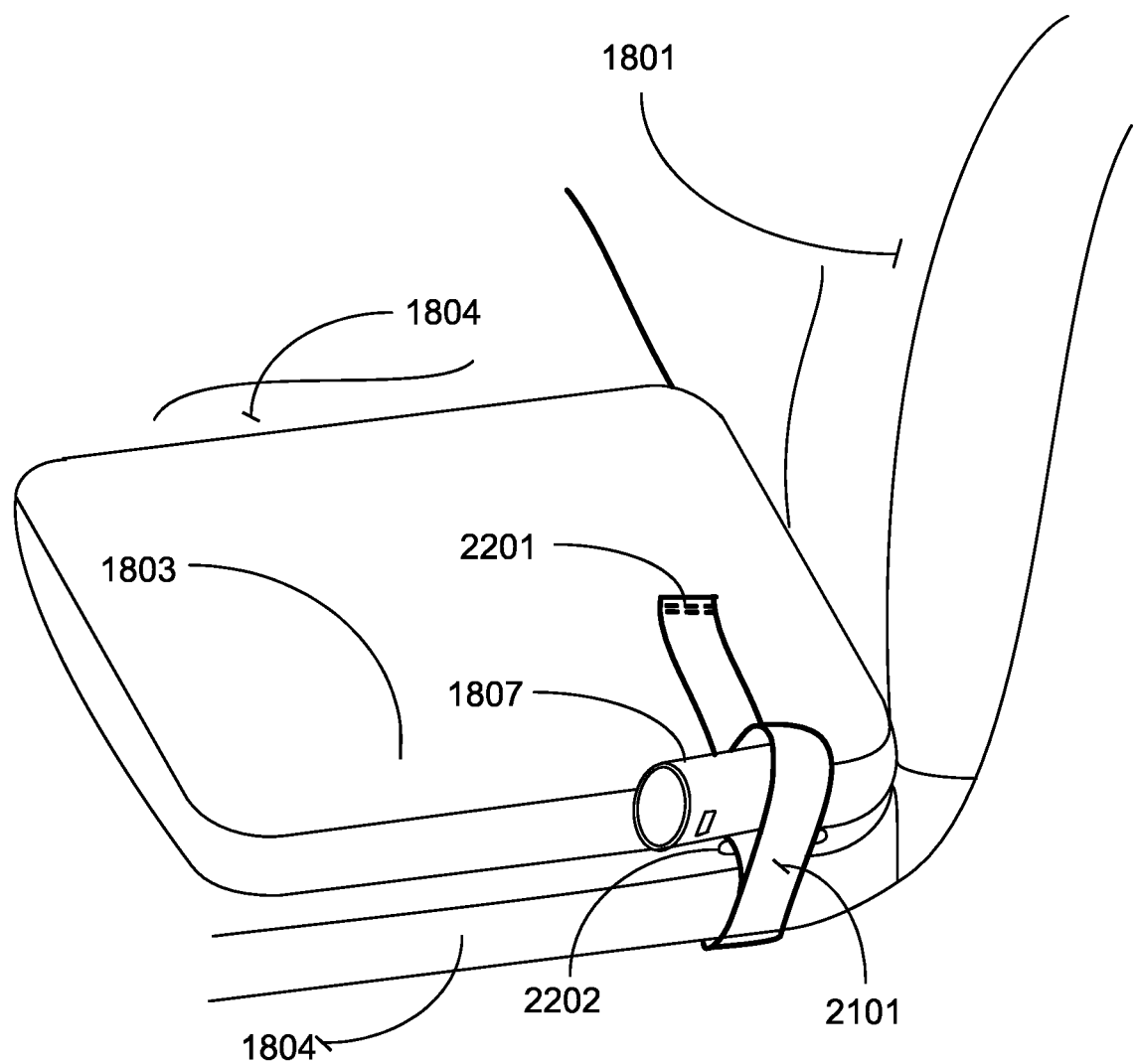
FIG. 20 is a partial perspective of the stroller of FIG. 18 depicting a privacy panel folded down.

FIG. 20 is a partial perspective view of stroller 1800 of FIG. 18 depicting a privacy panel folded down. In this view, privacy panel 1803 is depicted folded flat down against bottom seat 1804 with the arm bar removed for clarity. Material and seams are removed for clarity and to illustrate a hard gap between the solid parts to aid in unobstructed operation of the panels. The pull strap system referenced above in FIG. 18 is employed to pull panel 1803 to an upright position upon the action of unfolding stroller 1800 into a vertical position for use. The pull strap system includes two pull straps 2101 of a specific length and having an anchor point 2201, one strap employed at each side of the stroller seat bottom 1804. Pull strap 2101 may be fabricated of a heavy webbing material having an overall length, width, and material thickness.

The rear edge of privacy panel 1803 lies generally parallel with the fold line between the back rest 1801 and the seat bottom 1804. In this embodiment, one end of pull strap 2101 is sewn to the cover material on the outside of panel 1803, the configuration duplicated at the other side of the stroller. In one embodiment, pull strap 2101 is routed from the outside surface of panel 1803 down and into a slot 2202 placed through the seat bottom 1804, then underneath and around to the outside of the seat bottom 1804, and upward to be secured at the base tubular section 1807 of the arm bar (arm bar removed for clarity). A pair of slots 2202 is provided with one slot at each side of the stroller seat bottom 1804.

In this example, the free end of pull strap 2101 is formed into a loop by sewing, snapping, or pinning the strap end over on itself. The loop end is formed with sufficient inside diameter to fit loosely fit over the outside diameter of the tubular base portion 1807 of the arm bar. In one embodiment, pull strap 2101 may be connected to the tubular arm bar base 1807 by other methods such as by a snap interface, a hook interface, or another hardware implementation without departing from the spirit and scope of the invention.

In this embodiment, the angle of the arm bar changes during the folding and unfolding of the stroller platform becoming more acute to the horizontal plane of the seat bottom 1804 when folded and less acute when unfolded such that, when folded, enough of the strap material is held slack to allow the privacy panel 1803 to fold flat as depicted here in FIG. 20A. When stroller 1800 is unfolded for use, the slack in the pull strap 2101 is taken up by the angular raise of the arm bar pulling panel 1803 upright into a vertical position to abut against the inside of the arm bar with some force. In this way, privacy panels 1803 may be automatically popped up and may be automatically folded down in tandem without requiring manual placement or adjustments made by a user. Backrest 1801 may be further adjustable after the stroller is in a use position to change backrest angle up to horizontal for use as a changing table.

FIG. 21A is a partial enlarged view of stroller 1800 of FIG. 18 according to detail 1811 of FIG. 18 depicting a pull strap first position relative to the seat bottom of the stroller in the open position with panels up. In this view, pull strap 2101 is secured to the outside surface of privacy panel 1803 (not visible) at an anchor point 2201 (not visible) and is routed down and through slot 2202 (not visible) in seat bottom 1804, then around the near side of the seat bottom and then turned upward (loop) secured to or over the arm bar base tube 1807 (not visible). Stroller handle 1808 blocks visible reference of the arm bar base tube 1807; however, it is visible in the next view. A broken line is provided across pull strap 2101 for reference purposes depicting advancement of the pull strap through slot 2202 relative to the alternative folded position of the stroller. The broken line represents a mark identifying a position marker of the strap with reference to the unfolded state of the stroller where the privacy panel is held vertically.

FIG. 21B is a partial enlarged view of stroller 1800 of FIG. 18 according to detail 1811 of FIG. 18 depicting advance travel of the pull strap 2101 through the slot in a folded state of the stroller. The position marker is advanced a distance A relative to the seat bottom of the stroller in the folded position panels down. In this view, arm bar base 1807 is visible and securing the free end of the pull strap 2101. In the folded position, the privacy panels are down flat against seat bottom 1804. The broken reference line has advanced a distance of A (middle of drawing sheet) from the unfolded position depicted in FIG. 21A. Handle 1808 is presenting at a different angle revealing the arm bar base tube 1807. Distance A represents the amount of slack required in the pull strap loop to allow the privacy panel to fully lie down flat against the seat bottom 1804 when the stroller is folded down for storage.

Figure 22B:
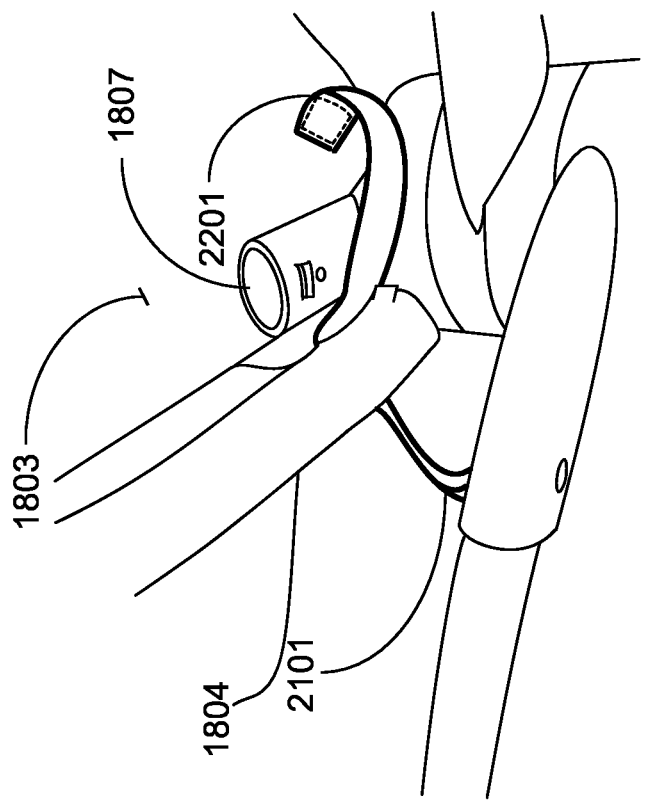
FIG. 22B is a partial enlarged view of detail 1811 of the stroller of FIG. 18 depicting the pull strap of FIG. 22A routed through the slot of FIG. 22A.
Figure 22A:
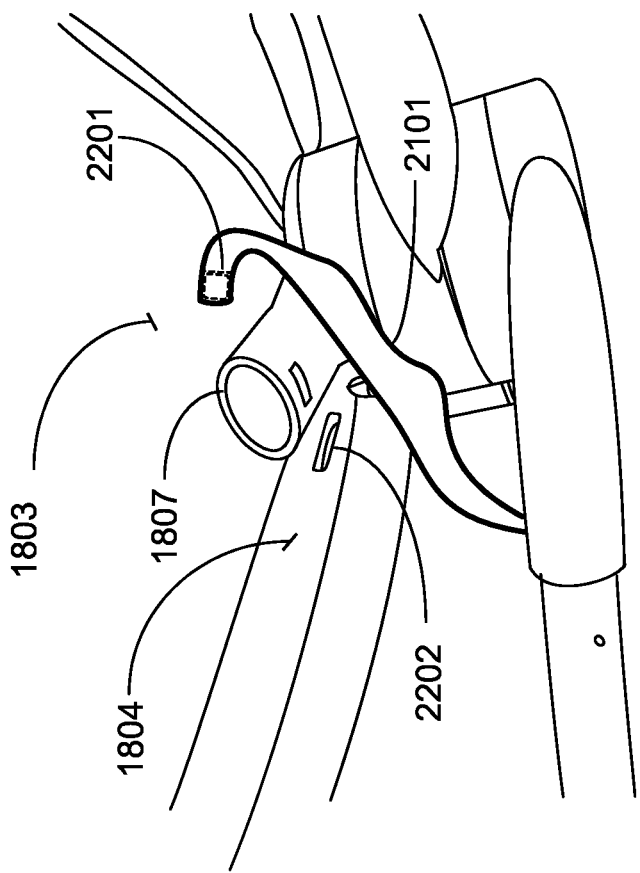
FIG. 22A is a partial enlarged view of detail 1811 of the stroller of FIG. 18 depicting the attachment end of the pull strap to the privacy panel before routing the pull strap to a slot in the seat bottom.

FIG. 22A is a partial enlarged view of detail 1811 of FIG. 18 depicting the attachment end of the pull strap to the privacy panel before routing the pull strap to a slot 2202 in the seat bottom. In this view, pull strap 2101 is sewn at one end to privacy panel 1803 at strap anchor point 2201. Anchor point 2201 is disposed to the outside surface of panel 1803 and toward the rear of the panel below horizontal center of the panel. Pull strap 2101 is not yet inserted into slot 2202. Slot 2202 is provided through the seat bottom substantially parallel to the near edge of the seat bottom at both sides of the seat bottom. Slot 2202 has a length and a width wherein the length and width accommodate the width and material thickness of pull strap 2101 to provide a smooth or otherwise non-binding sliding fit through slot 2202. The configuration may be duplicated on the other side of the stroller. Slots 2202 may have rounded smooth edges and polished inner walls to aid in reducing friction against pull strap 2101 advancing there through bi-directionally and repetitively when the stroller is operated.

FIG. 22B is a partial enlarged view of the stroller of FIG. 18 depicting the pull strap of FIG. 22A routed through the slot of FIG. 22A. In this view, pull strap 2201 is routed over arm bar base tube 1807 and inserted directly into the slot in seat 1804 through the top to bottom before routing the free end around the seat bottom and up to secure the strap to the base tube 1807.

Figure 23:
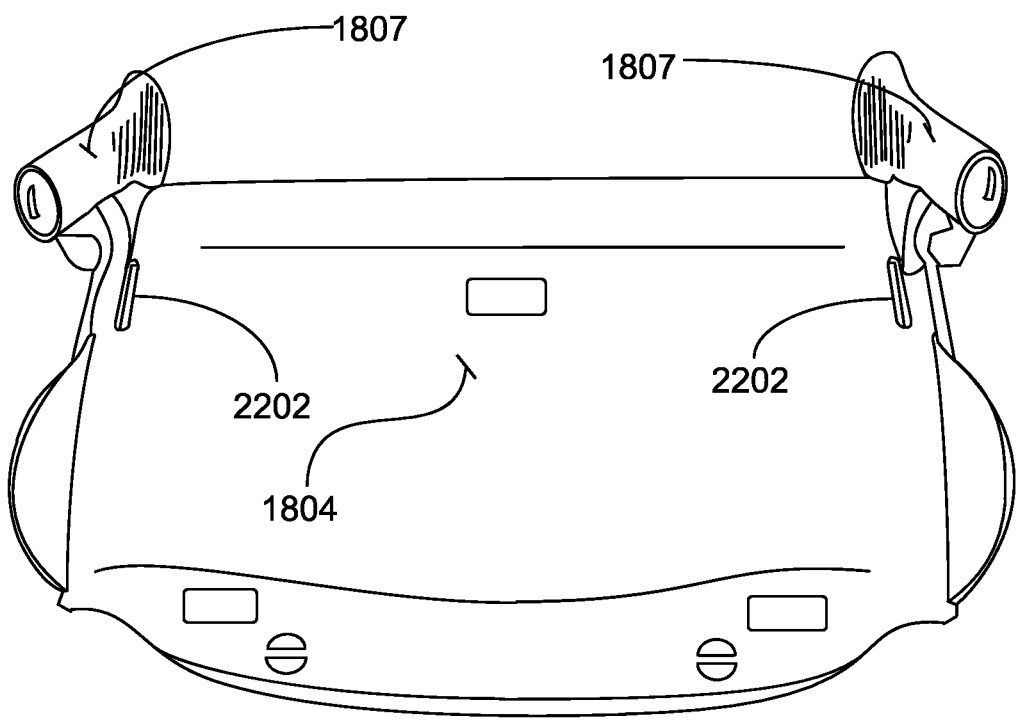

FIG. 23 is a partial overhead perspective view of stroller seat bottom 1804 of FIG. 18 with material removed depicting the elongate slots 2202 through the seat bottom 1804 for routing pull straps through. Slots 2202 are substantially parallel with respective outside edges of seat bottom 1804. Each slot is disposed near to the rear edge of seat bottom 1804 and near to the inside edge of the base tubes 1807 of the arm bar (removed for clarity).

Figure 24:
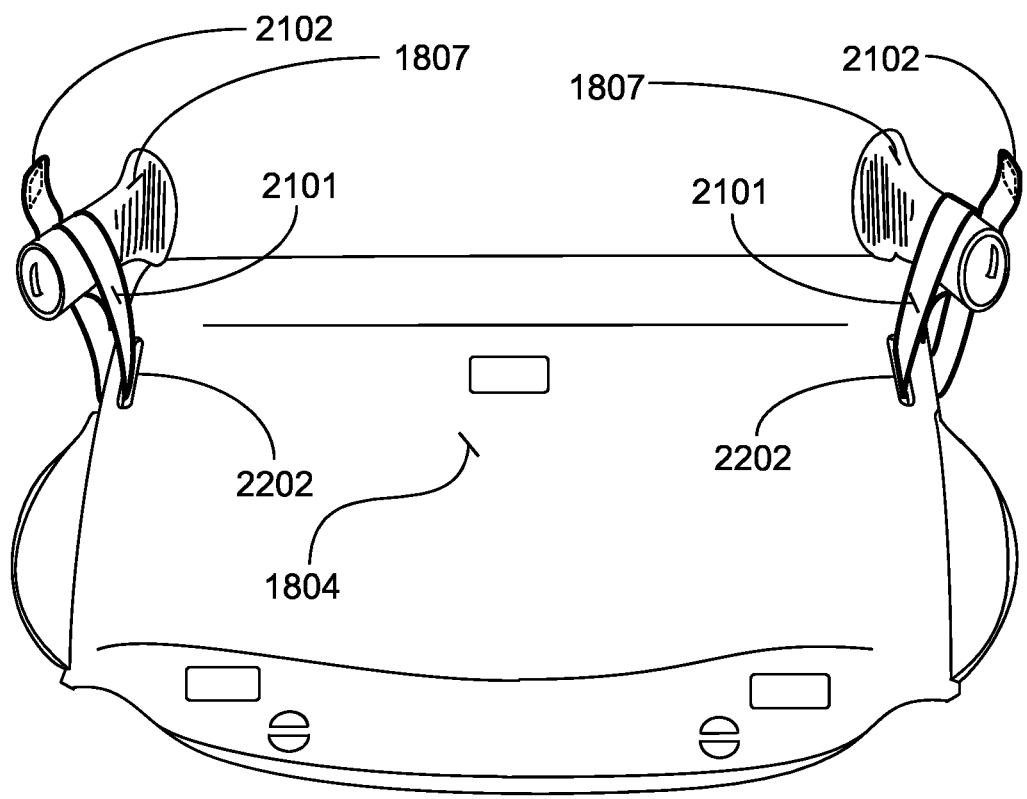
FIG. 24 is a partial overhead perspective view of seat bottom of FIG. 23 with material removed depicting pulls straps routed through the slots in the seat bottom and around the outside of the seat.

FIG. 24 is a partial overhead perspective view of seat bottom of FIG. 23 with material removed depicting pulls straps routed through the slots 2202 in the seat bottom 1804 and around the outside of the seat. In one embodiment, pull strap 2101 is routed slightly differently than what is described further above. Further above it is disclosed that the pull strap 2101 is sewn to the material on the outside surface of the privacy panel 1803 at the anchor point 2102 (FIG. 22A). The free end of the pull strap is routed directly into slot 2202 from the top down through the slot and then around the underside of the seat bottom 1804 to the outside edge and then upward to secure over or attach to the arm bar base tube 1807.

Alternatively, the free end of pull strap 2101 anchored to the material covering the privacy panel 1803 at anchor point 2201 may be routed down past the outside edge of seat bottom 1804 and then up through slot 2202 from the bottom up and then routed further up to arm bar base tubes 1807 at both sides of the configuration. In this embodiment, a loop is fastened at the free end of the pull strap to loop over the base tube 1807 of the arm bar. This alternative routing provides the same operational characteristics attributed to the privacy panels pulled into vertical when the stroller is unfolded from a folded position and falling back inward to fold when the stroller is folded for storage. The alternative routing of the pull strap is described in more detail below.

Figure 25B:
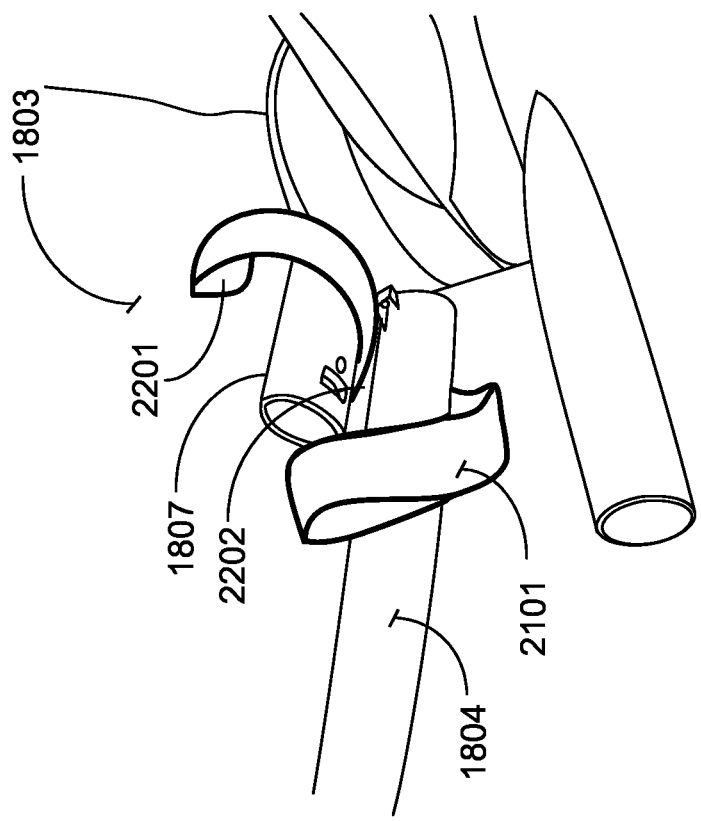
FIG. 25A is a partial perspective view of the stroller of FIG. 18 depicting the pull strap sewn to the outside of the privacy panel and routed through the slot according to an alternate routing embodiment.
FIG. 25 B is a partial perspective view of the stroller of FIG. 18 depicting the pull strap routed from the anchor point into the slot from the top according to the first routing embodiment.
Figure 25A:
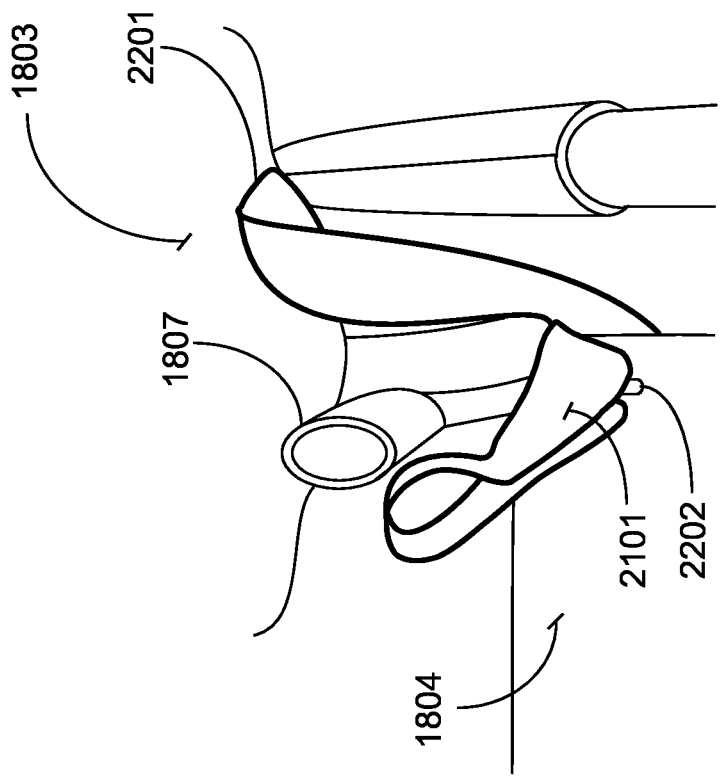

FIG. 25A is a partial perspective view of stroller 1800 of FIG. 18 depicting the pull strap sewn to the outside of the privacy panel and routed through the slot according to an alternate routing embodiment. In this alternative routing embodiment, pull strap 2101 is anchored at one end to the outside of privacy panel 1803 at anchor point 2201. Strap 2101 is routed from the anchor point 2201 down to the outside of seat bottom 1804 and then around and up through the strap slot 2202. The loop at the free end of the pull strap 2101 is ready to be placed over the arm bar base tube 1807. Once the loop is secured over the base tube at both sides of the stroller, the arm bar (1808) may be placed into position.

FIG. 25B is a partial perspective view of stroller 1800 of FIG. 18 depicting the pull strap 2101 routed from the anchor point 2201 down into the slot 2202 from the top according to the first described routing embodiment. In this view, pull strap 2101 anchored to privacy panel 1803 by anchor point 2102 is first directed into the slot 2202 directly from the top and then brought around underneath to the outside of the seat bottom 1804 and up to arm bar base tube 1807. The loop at the free end is secured over the arm bar base tube 1807 before the arm bar is attached. This routing configuration may be duplicated at both sides of the stroller.

Figure 26:
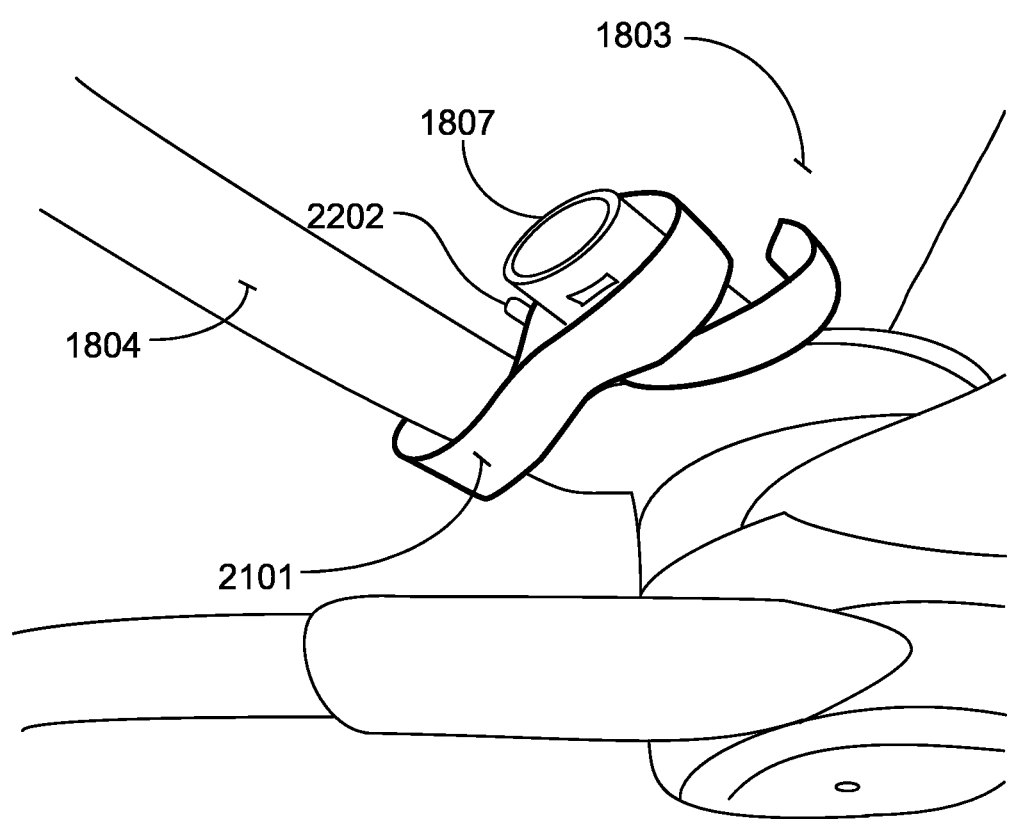
FIG. 26 is a partial perspective view of the stroller of FIG. 18 depicting the pull strap anchored to the privacy panel and routed through the seat bottom with the loop at the free end secured over the arm bar base portion.

FIG. 26 is a partial perspective view of stroller 1800 of FIG. 18 detail 1811 of FIG. 18 depicting the pull strap 2101 anchored to the privacy panel and routed through the seat bottom 1804 with the loop at the free end secured over the arm base portion. This view depicts the first described routing embodiment of FIG. 25B above with the loop of strap 2101 secured over the arm bar base 1807. Pull strap 2101 may be cut to a specific length (extra for loop) to ensure the proper length is provided to enable the side panels 1803 to lay flat against the seat bottom when the stroller is folded, and to enable them to be pulled up to the vertical position with the panels abutting against the inside of the arm bar.

In a variation to the embodiments described above, pull strap 2101 may not be anchored to the outside surface of the privacy panel 1803 at anchor point 2201. Rather, it may be routed through the panel from the outside to the inside surface of the privacy panel and anchored at the inside surface. According to this variation, top seams (1805, FIG. 18) may be provided in the material sides of the back rest (1801) at the lower ends thereof creating a pair of angled fold lines extending from the outside inward and downward at angle to the seam connecting the back rest to the seat bottom. Plastic sheets may be added over padding on the inside beneath the material in this area (both sides of backrest) to stiffen the material. The plastic sheeting remains hidden beneath the material.

The above-described modification allows the outside material lower sides of the back rest to contact the privacy panels on the outside rear corners to urge the privacy panels inward and downward toward the seat bottom 1804 when folding the stroller. This ensures that the panels are urged down with mild force relieving the user from a task of physically urging the panels inward or having to check for that before folding the stroller. In another embodiment, privacy panels 1803 may each be weighted on the inside surfaces, preferably along the top inside surfaces so that they may naturally fall inward if not being held in vertical position by the tension of the pull straps 2101.

With respect to the above description then, it is to be realized that the optimum dimensional relationships for the parts of an embodiment enabled by the disclosure to include variations in size, materials, shape, form, function, manner of operation, assembly, and use are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

In various embodiments described in enabling detail herein, the inventor provides a unique stroller convertible into a diaper changing table with pop-up privacy panels requiring less effort by the user to operate safely. The present invention is described using the following examples, which may describe more than one relevant embodiment falling within the scope of the invention.

It will be apparent with skill in the art that the stroller with pop up privacy panels of the present invention may be provided using some or all the elements described herein. The arrangement of elements and functionality thereof relative to the smart card of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. An articulating stroller platform comprising:
a materially encapsulated seat portion connected in articulating manner to a materially encapsulated back rest portion, the back rest portion mechanically adjustable to fold down over the seat portion and mechanically adjustable to unfold from the folded position, the back rest portion additionally mechanically adjustable to present a horizontal relationship with the seat portion from a more acute angle with the seat portion for use as a diaper changing table;
a pair of materially encapsulated privacy panels connected by material seam to opposing material edges of the seat portion, the privacy panels positional to assume a vertical position when the stroller platform is unfolded, and to assume a prone position against the top surface of the seat portion when the stroller platform is folded; and
a pair of elongate pull straps each anchored to a privacy panel on each side of the stroller platform, the pull straps each routed through respective ones of elongate slots provided through the seat portion, and back up to connect to or over respective ones of a pair of arm bar base tubes connected to a stroller frame, the base tubes provided to seat an arcuate tubular arm bar presenting to the front and above the seat portion of the stroller platform.

2. The stroller platform of claim 1, wherein each of the pull straps are attached by sewing to the respective privacy panel at the outside facing surface thereof.

3. The stroller platform of claim 1, wherein each of the pull straps are attached by sewing to the respective privacy panel at the inside facing surface thereof and routed through the panel to the outside surface.

4. The stroller platform of claim 1, wherein each of the pull straps is routed from the outside of the respective privacy panel downward into the respective elongate slot in the seat portion, out past the outside edge of the seat portion and upward to connect to or over the respective arm bar base tube.

5. The stroller platform of claim 1, wherein each of the pull straps is routed from the outside of the respective privacy panel downward past the outside edge of the seat portion, inward and upward through the respective elongated slot in the seat portion and upward to connect to or over the respective arm bar base tube.

6. The stroller platform of claim 1, wherein the respective free ends of the pull straps are loops that are placed over the ends of the arm bar base tubes before the arm bar is attached to the stroller platform.

7. The stroller platform of claim 1, wherein the respective free ends of the pull straps include a connection interface that connects to the arm bar base tubes.

8. The stroller platform of claim 7, wherein the connection interface is a snap interface, a hook interface, or another hardware implementation.

9. The stroller platform of claim 1, wherein the privacy panels are urged inward by the interfacing sides of the backrest portion contacting the privacy panels at the top rear corners thereof upon folding the stroller platform.

10. The stroller platform of claim 1, wherein the privacy panels are weighted on the inside surfaces to promote natural inward direction of fall while folding the stroller platform.

* * * * *